(12) United States Patent
Sutardja

(10) Patent No.: US 7,522,370 B1
(45) Date of Patent: *Apr. 21, 2009

(54) SELF-SERVO-WRITE USING RAMP-TRACKS

(75) Inventor: Pantas Sutardja, Los Gatos, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 11/739,620

(22) Filed: Apr. 24, 2007

Related U.S. Application Data

(63) Continuation of application No. 11/030,619, filed on Jan. 5, 2005, now Pat. No. 7,209,312.

(60) Provisional application No. 60/588,832, filed on Jul. 15, 2004, provisional application No. 60/588,833, filed on Jul. 16, 2004.

(51) Int. Cl.
*G11B 5/596* (2006.01)

(52) U.S. Cl. .................................. 360/77.07

(58) Field of Classification Search .............. 360/75, 360/51, 77.07, 78.05, 78.04
See application file for complete search history.

(56) References Cited

U.S. PATENT DOCUMENTS

| | | | |
|---|---|---|---|
| 4,635,138 A | 1/1987 | Louth | |
| 4,672,474 A | 6/1987 | Rodal | |
| 5,448,429 A | 9/1995 | Cribbs et al. | |
| 5,541,784 A | 7/1996 | Cribbs et al. | |
| 5,559,648 A | 9/1996 | Hunter et al. | |
| 5,612,833 A | 3/1997 | Yarmchuk et al. | |
| 5,668,679 A | 9/1997 | Swearingen et al. | |
| 5,774,298 A | 6/1998 | Cheung et al. | |
| 5,907,447 A | 5/1999 | Yarmchuk et al. | |
| 6,023,389 A | 2/2000 | Cunningham | |
| 6,040,955 A | 3/2000 | Brown et al. | |
| 6,260,257 B1 | 7/2001 | Emo et al. | |
| 6,304,407 B1 | 10/2001 | Baker et al. | |
| 6,324,030 B1 | 11/2001 | Cheung et al. | |
| 6,504,882 B1 | 1/2003 | Kim | |
| 6,507,450 B1 | 1/2003 | Elliott | |
| 6,600,621 B1* | 7/2003 | Yarmchuk | 360/75 |
| 6,603,722 B1 | 8/2003 | Taguchi et al. | |
| 6,704,156 B1 | 3/2004 | Baker et al. | |

(Continued)

OTHER PUBLICATIONS

U.S. Appl. No. 10/799,474, filed Mar. 11, 2004, "Disk Servo Pattern Writing".

*Primary Examiner*—Fred Tzeng

(57) ABSTRACT

Systems and techniques relating to writing servo information on a machine-readable medium. A technique includes forming servo information using a band of ramp-tracks generated based on a mechanical characteristic of a storage device. This can involve writing the band of ramp-tracks, including an embedded timing reference, to a machine-readable medium, and writing the servo information to the machine-readable medium using the band of ramp-tracks, including the embedded timing reference. An apparatus can include a self-servo-write (SSW) controller configured to direct writing of a band of ramp-tracks to a machine-readable medium based on a given rotational relationship between the machine-readable medium and a transducer. The SSW controller includes an SSWCLK generator, an angular position generator, a ramp-track pattern generator, and a servo wedge window period generator. The apparatus can be implemented as an integrated circuit device (e.g., a silicon device), a read/write channel, a disk drive, or combinations of these.

21 Claims, 17 Drawing Sheets

U.S. PATENT DOCUMENTS

| | | | |
|---|---|---|---|
| 6,738,205 B1 | 5/2004 | Moran et al. | |
| 6,775,091 B1 | 8/2004 | Sutardja | |
| 6,775,338 B1 | 8/2004 | Sutardja | |
| 6,924,960 B1 | 8/2005 | Melkote et al. | |
| 6,937,420 B1 | 8/2005 | McNab et al. | |
| 6,970,320 B2 * | 11/2005 | Sugiyama et al. | 360/75 |
| 6,977,794 B1 | 12/2005 | Sun et al. | |
| 7,019,933 B2 * | 3/2006 | Iseri et al. | 360/75 |
| 7,046,475 B2 | 5/2006 | Hosokawa | |
| 7,054,090 B2 * | 5/2006 | Ikeda et al. | 360/75 |
| 7,079,347 B2 * | 7/2006 | Cisewski et al. | 360/75 |
| 7,085,084 B2 * | 8/2006 | Yasuna et al. | 360/51 |
| 7,164,552 B2 * | 1/2007 | Yamamoto | 360/78.05 |
| 7,215,498 B2 * | 5/2007 | Calfee et al. | 360/75 |
| 7,248,426 B1 * | 7/2007 | Weerasooriya et al. | 360/51 |
| 7,274,527 B2 * | 9/2007 | Calfee et al. | 360/75 |
| 7,301,717 B1 * | 11/2007 | Lee et al. | 360/51 |
| 7,333,280 B1 * | 2/2008 | Lifchits et al. | 360/51 |
| 7,342,735 B2 * | 3/2008 | Hashimoto et al. | 360/75 |
| 7,349,171 B2 * | 3/2008 | Rutherford et al. | 360/75 |
| 2001/0033451 A1 | 10/2001 | Miles | |
| 2005/0078566 A1 | 4/2005 | Wilson et al. | |
| 2005/0280916 A1 | 12/2005 | Calfee et al. | |
| 2006/0056097 A1 * | 3/2006 | Hashimoto et al. | 360/75 |
| 2006/0056099 A1 * | 3/2006 | Hashimoto et al. | 360/75 |
| 2006/0187568 A1 * | 8/2006 | Castagna | 360/75 |

* cited by examiner

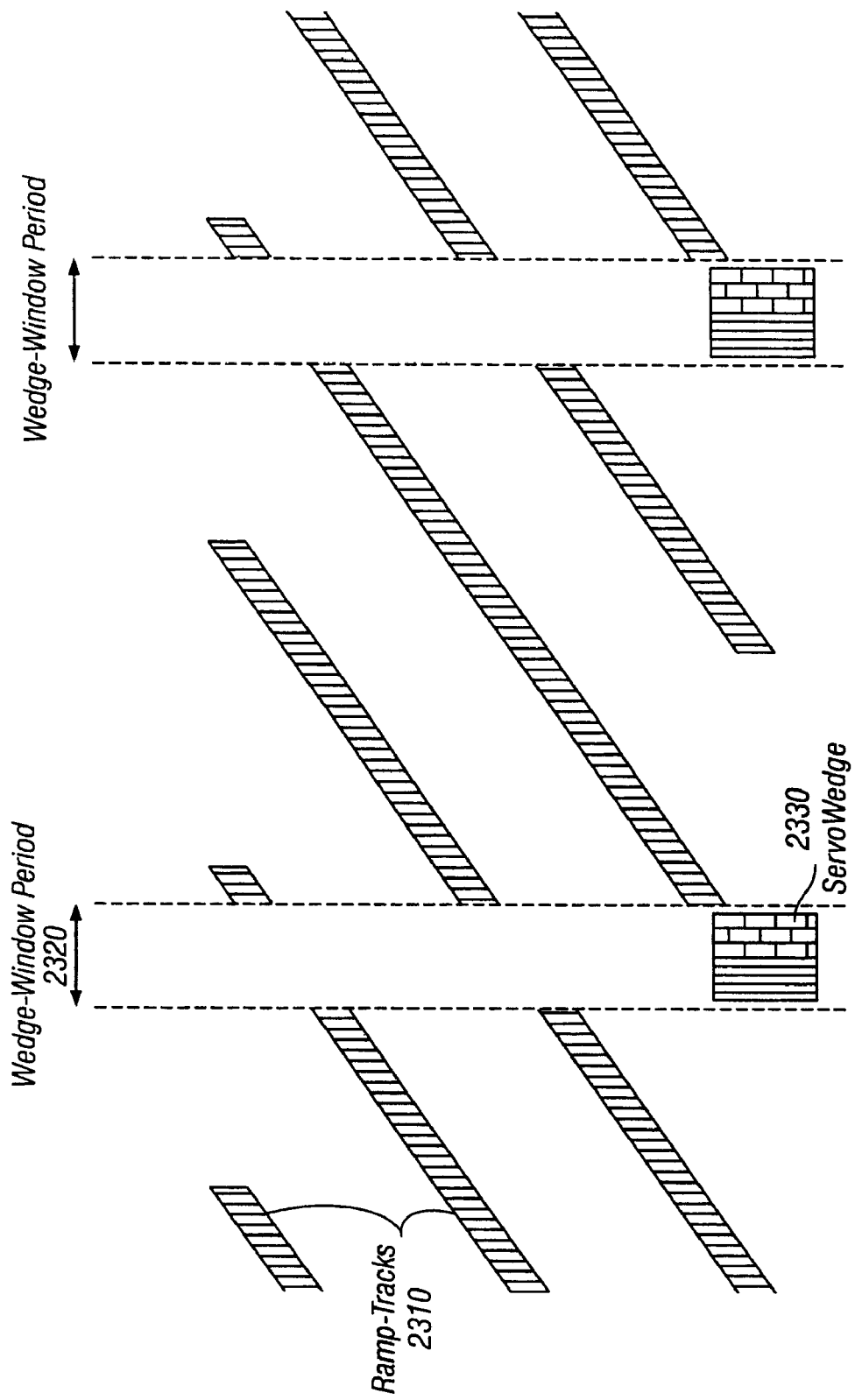

SELF-SERVO-WRITE USING RAMP-TRACKS

CROSS REFERENCE TO RELATED APPLICATIONS

This application is a continuation of and claims the benefit of the priority to U.S. patent application Ser. No. 11/030,619 filed Jan. 5, 2005 and entitled "Self-Servo-Write Using Ramp-Tracks", which claims the benefit of the priority of U.S. Provisional Application Ser. No. 60/588,832, filed Jul. 15, 2004 and entitled "Self-Servo-Write Method Using Multiple Bands of Ramp-Tracks", and of U.S. Provisional Application Ser. No. 60/588,833, filed Jul. 16, 2004 and entitled "Self-Servo-Write Method Using Multiple Bands of Ramp-Tracks"; this application is also related to U.S. patent application Ser. No. 10/799,474, filed Mar. 11, 2004, and entitled "DISK SERVO PATTERN WRITING".

TECHNICAL FIELD

The present disclosure describes systems and techniques relating to servos and writing disk servo information, for example, systems and techniques for post-assembly, self-servowriting a magnetic recording disk.

BACKGROUND

In magnetic-medium-based storage devices, data is typically stored on circular, concentric tracks on a magnetic disk surface. A read-write head retrieves and records data on the magnetic layer of a rotating disk as it flies on a cushion of air over the disk surface. When retrieving data, magnetic field variations are converted into an analog electrical signal, the analog signal is typically amplified, converted to a digital signal and interpreted. To guarantee the quality of the information saved on and read back from the disk, the read-write head should be very accurately positioned at the center of the track during both writing and reading. Frequently, a closed-loop servo system, driven by servo information embedded in a dedicated portion of every track of the recording surface, is used to accurately position the head and follow the track.

The servo information defines the position of the data tracks and thus should be written with great accuracy in order for a head servo system to operate properly. Typically, the servo information is written on each surface as a radially extending set of spokes or wedges. The portion of a servo wedge at a particular track location may contain a sync field, an index mark, a gray coded track number, and two or more fine-positioned offset bursts configured in an echelon across the track. Head positioning relative to a track center can be determined and corrected, if necessary, by reading and noting the respective amplitudes and timings of the offset bursts.

Traditionally, a machine called a servo writer is used to write the embedded servo information on the disk surface. Commonly, a servo writer uses a large, massive granite base to minimize the effects of vibration. The servo writer can also use precision fixtures to hold the target drive, a precision, laser-interferometer-based actuator arm positioning mechanism to place the arms radially with respect to the axis of rotation of the disks in the drive, and an external clock head to position the servo wedges in time. Present servo writers are typically large and expensive, and as the typical track density increases, the servo writing time also increases, which can create a bottleneck in the disk drive manufacturing process at the servo writer station.

Various attempts have been made to reduce usage of such servo writers. For example, some servo writing techniques have used a servo writer to generate high quality seed wedges, from which additional servo wedges can be generated by the disk drive itself using propagation self-servo write techniques. Other approaches have tried to eliminate the traditional servo writer altogether by pre-writing the disk with a low frequency reference pattern. Yet another approach has been to attempt an increase in throughput per servo writer by writing a spiral servo pattern on the disk, from which servo wedges can be generated by the disk drive itself.

SUMMARY

The present disclosure includes systems and techniques relating to writing servo information on a machine-readable medium. According to an aspect of the described systems and techniques, a technique includes forming servo information using a band of ramp-tracks generated based on a mechanical characteristic of a storage device. This can involve generating a timing reference signal based on a given rotational relationship between a machine-readable medium and a transducer; writing the band of ramp-tracks, including an embedded timing reference, to the machine-readable medium based on the generated timing reference signal; and writing the servo information to the machine-readable medium using the band of ramp-tracks, including the embedded timing reference.

The mechanical characteristic can be an electro-mechanical characteristic, and writing a ramp-track can involve operating a head and spindle motor control assembly under an open-loop condition for a short time duration such that the ramp-track spans less than half a distance from an inner diameter to an outer diameter of the machine-readable medium. Writing the servo information can involve writing a first portion of final servo information to the machine-readable medium using the band of ramp-tracks, and writing a second portion of final servo information to the machine-readable medium using the first portion of final servo information.

Writing the second portion of final servo information can involve, iteratively, writing a next band of ramp-tracks using a previously written portion of the final servo information as a reference, and writing a next portion of the final servo information using a previously written band of ramp-tracks as a reference. Writing a ramp-track can involve initiating a Voice-Coil Motor (VCM) ramping process from a preset angular position using a previously calibrated VCM current profile, where the VCM ramping process involves: accelerating a VCM actuator to a target radial velocity in a first target amount of time, and writing the ramp-track during a second target amount of time while maintaining the target radial velocity.

Writing the bands of ramp-tracks can involve writing overlapping, staggered bands of ramp-tracks such that ramps from one band do not intersect with ramps from a previous band. Writing the portions of the final servo information can involve extending a servo track zone past an edge of a corresponding ramp-track zone to prevent intersection of ramp-tracks from one ramp-track zone with ramp-tracks from a previous ramp-track zone.

Generating the timing reference signal can involve selecting as an initial index reference a Back Electromotive Force (BEMF) pulse produced by the machine-readable medium rotating at a constant angular velocity with the transducer located at a hard stop position and a self-servo-write clock locked to spindle speed. Generating the timing reference signal can involve: spinning the machine-readable medium to a constant angular velocity, moving the transducer to a hard stop position, locking a self-servo-write clock (SSWCLK) to spindle speed, writing a timing track to the machine-readable medium, and locking the SSWCLK to the timing track.

Writing the timing track can involve writing two or more sync-bit patterns in the timing track. Writing the timing track can involve using a Manchester (biphase) code in writing the two or more sync-bit patterns in the timing track. Writing the band of ramp-tracks can involve writing two or more sync-bit patterns in the band of ramp-tracks. Writing the band of ramp-tracks can involve using a Manchester (biphase) code in writing the two or more sync-bit patterns in the band of ramp-tracks.

Ramp-track slope can be measured as a function of write head track width, and a radial stepping size can be adjusted based on this measuring to facilitate writing of uniformly spaced servo tracks. Additionally, the disclosed techniques can be implemented using a software program operable to cause a storage device to perform the operations.

According to another aspect, an apparatus can include a self-servo-write controller configured to direct writing of a band of ramp-tracks to a machine-readable medium based on a given rotational relationship between the machine-readable medium and a transducer, where the self-servo-write controller includes a self-servo-write clock (SSWCLK) generator configured to be locked to spindle speed, an angular position generator responsive to the SSWCLK generator, a ramp-track pattern generator responsive to the SSWCLK generator, and a servo wedge window period generator responsive to the angular position generator.

The self-servo-write controller can further include: a write protect component responsive to the servo wedge window period generator, a sync-bit component configured to identify sync-bits in a readback waveform, and a waveform amplitude demodulator configured to measure ramp-track shape. The sync-bit component can include a sync-bit pattern detector and a timestamp circuit configured to detect locations of sync-bits relative to rotation angle. Moreover, the self-servo-write controller can further include a timestamp circuit configured to measure Back Electromotive Force (BEMF) edges in terms of angular position.

The ramp-track pattern generator can be configured to produce multiple sync-field patterns and be configured to be used in writing both ramp-tracks and an initial timing track. The transducer can include a write element and a read element having a radial offset from each other. Furthermore, the SSWCLK generator can be configured to be controlled by a programmable processor, and the angular position generator can include multiple modulo counters.

The apparatus can be implemented in various devices and storage systems, including being implemented as an integrated circuit device (e.g., a silicon device), a read/write channel, a disk drive, or combinations of these. Moreover, the disclosed subject matter, including the functional operations described in this specification, can be implemented in electronic circuitry, or in computer hardware, firmware, software, or in combinations of them, such as the structural means disclosed in this specification and structural equivalents thereof.

Thus, an apparatus can include self-servo-write means for directing writing of a band of ramp-tracks to means for recording machine information, based on a given rotational relationship between the means for recording and transducer means for interfacing with the means for recording. The self-servo-write means can include means for producing a self-servo-write clock (SSWCLK) locked to spindle speed, means for determining angular position, means for producing a ramp-track pattern, and means for setting a servo wedge window period.

The self-servo-write means can further include: means for asserting a write protect signal responsive to the means for setting the servo wedge window period, means for identifying sync-bits in a readback waveform, and means for demodulating a waveform amplitude and for measuring ramp-track shape. The means for identifying sync-bits can include sync-bit pattern detection and timestamp means for detecting locations of sync-bits relative to rotation angle. Moreover, the self-servo-write means can further include means for measuring BEMF edges in terms of angular position.

The means for producing the ramp-track pattern can include means for producing multiple sync-field patterns and means for providing sync-field patterns during writing of both ramp-tracks and an initial timing track. The transducer means can include means for writing information and means for reading information with a radial offset. Furthermore, the means for producing SSWCLK can include means for receiving control information from processor means for programming device operations, and the means for determining angular position can include multiple modulo means for counting.

The described systems and techniques can result in improved self-servowriting in storage devices, enabling post-assembly, self-servowriting of a magnetic recording disk that has been left blank during construction of the disk drive. Ramp-tracks can be written to a recording disk with sufficient density to provide high quality position and timing information, without the ramp tracks intersecting each other. A band of ramp-tracks can be written starting from a hard-stop position in a fully assembled disk drive, and the band of ramp-tracks can then be used as a seed from which servo information can be written to the disk.

A read-write head can coast at a well known radius (e.g., the inner diameter or outer diameter), and a ramp-track can be written during a short period of time after this coasting, the read-write head being moved a small amount of time under an open-loop condition. A set of ramp tracks written in this manner can then be used as a bootstrap position for writing servo information, including potentially writing multiple sets of ramp-tracks across the surface of the disk. The open-loop drive condition can be kept as short as possible during the writing of the ramp-tracks. For the bands of ramp-tracks written after the first band, the head can be positioned on a previously written servo track close to the edge of the previous band. Additional benefits can also be obtained by placing the head many tracks inside the edge of the last written servo track band and relying on closed-loop control to move/accelerate to a desired velocity before releasing to open-loop, non-drive coasting. Moreover, ramp slope measurements can be performed to facilitate generation of uniformly spaced servo tracks.

Details of one or more implementations are set forth in the accompanying drawings and the description below. Other features, objects and advantages may be apparent from the description and drawings, and from the claims.

DRAWING DESCRIPTIONS

FIG. 23 shows an expanded view of example ramp-tracks.

Like reference symbols in the various drawings indicate like elements.

DETAILED DESCRIPTION

The systems and techniques described herein can be implemented as one or more devices, such as one or more integrated circuit (IC) devices, in a storage device. For example, they can be implemented in a read/write channel transceiver device suitable for use in a magnetic recording system. In general, a storage device employing self-servo-write as described includes a machine-readable medium (e.g., a magnetic-media disk) and a transducer (e.g., a medium read element and a medium write element, which can be integrated into a single read-write head).

Figure 1:
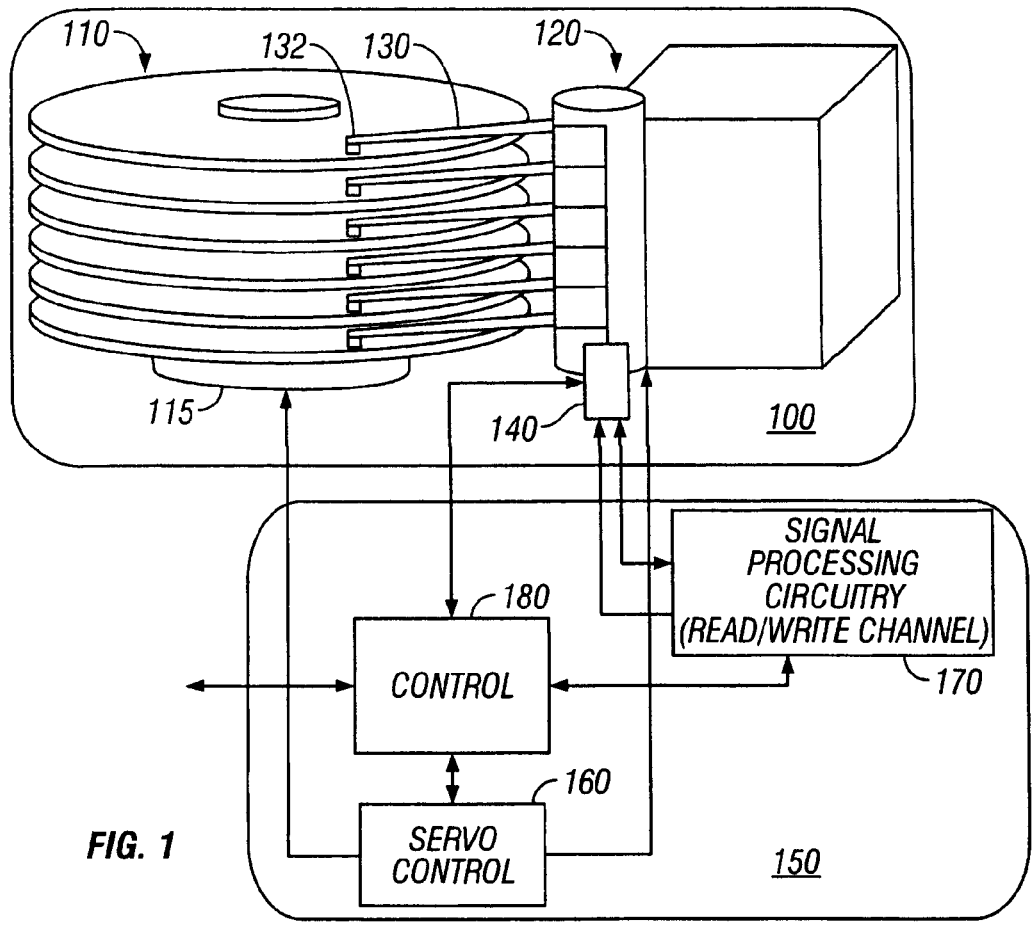
FIG. 1 is a block diagram showing an example magnetic-media disk drive that employs self-servo-write using ramp-tracks.

FIG. 1 is a block diagram showing an example magnetic-media disk drive that employs self-servo-write using ramp-tracks. The disk drive includes a head-disk assembly (HDA) 100 and drive electronics 150 (e.g., a printed circuit board assembly (PCBA) with semiconductor devices). The HDA 100 includes one or more disks 110 mounted on an integrated spindle and motor assembly 115. The spindle and motor assembly 115 rotates the disk(s) 110 under read-write head(s) connected with a head assembly 120 in the HDA 100. The disk(s) 110 can be coated with a magnetically hard material (e.g., a particulate surface or a thin-film surface) and can be written to, or read from, a single side or both sides of each disk.

A head 132 on an arm 130 can be positioned as needed to read data on the disk. A motor, such as a voice coil motor (VCM), can be used to position the head over a desired track. The arm 130 can be a pivoting or sliding arm and can be spring-loaded to maintain a proper flying height for the head 132 in any drive orientation. A closed-loop head positioning system can be used.

The HDA 100 can include a preamp/writer 140, where head selection and sense current value(s) can be set. The preamp/writer 140 can amplify a read signal before outputting it to signal processing circuitry 170. The signal processing circuitry 170 can include a read signal circuit, a servo signal processing circuit, and a write signal circuit.

Signals between the HDA 100 and the drive electronics 150 can be carried through a flexible printed cable. A controller 180 can direct a servo controller 160 to control mechanical operations, such as head positioning through the head assembly 120 and rotational speed control through the motor assembly 115. The controller 180 can be one or more IC chips (e.g., a combo chip), which can include read/write channel signal processing circuitry 170. The controller 180 can be a microprocessor and a hard disk controller. The drive electronics 150 can also include various interfaces, such as a host-bus interface, and memory devices, such as a read only memory (ROM) for use by a microprocessor, and a random access memory (RAM) for use by a hard disk controller. The read/write channel 170 can include error correction circuitry.

The disk drive includes a self-servo-write controller that causes servo information to be written on the machine-readable medium as described. The self-servo-write controller can be integrated into a device, such as a read/write channel transceiver device (e.g., the read/write channel 170) suitable for use in a magnetic recording system. The self-servo-write controller can be composed of multiple sets of coordinating circuitry and can be integrated with the components described above or organized into a separate component of a disk drive. For example, the self-servo-write controller can be integrated into the controllers 160, 180, the read/write channel 170, the preamp/writer 140, or various combinations of these components (e.g., the components 160, 170, 180 can all be combined into a single integrated circuit).

Figure 2:
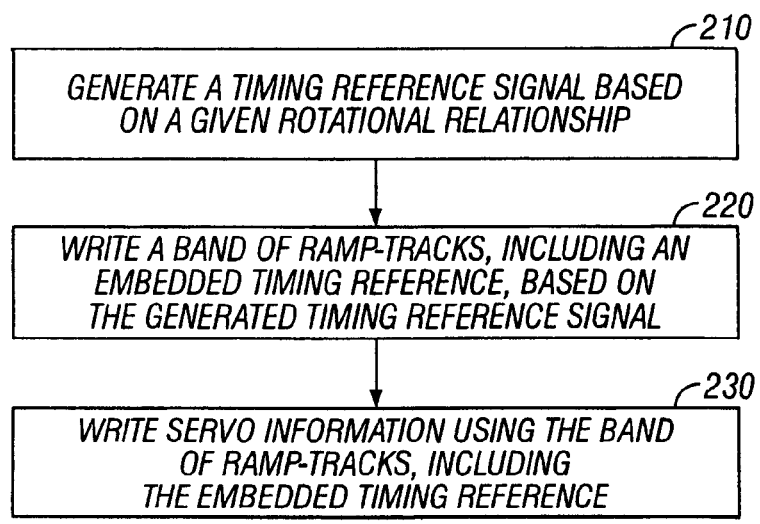
FIG. 2 shows a process of self-servowriting.

FIG. 2 shows a process of self-servowriting. A timing reference signal is generated based on a given rotational relationship between a machine-readable medium and a transducer at 210. A band of ramp-tracks, including an embedded timing reference, is written to the machine-readable medium based on the generated timing reference signal at 220. Servo information is written to the machine-readable medium using the band of ramp-tracks, including the embedded timing reference, at 230.

Detailed examples of these operations in the context of a magnetic-media disk are described below. However, alternative embodiments are also possible. For example, the initial set of ramp-tracks can be used as a seed for propagation self servo write (SSW) techniques. In this approach, the propagation SSW techniques can be used to propagate the servo tracks all the way to the other end of the disk, such as when the read-write head has a write element that is always ahead of the read element in the direction of propagation. Thus, in some implementations, only a single set of ramp-tracks need be written.

Figure 3:
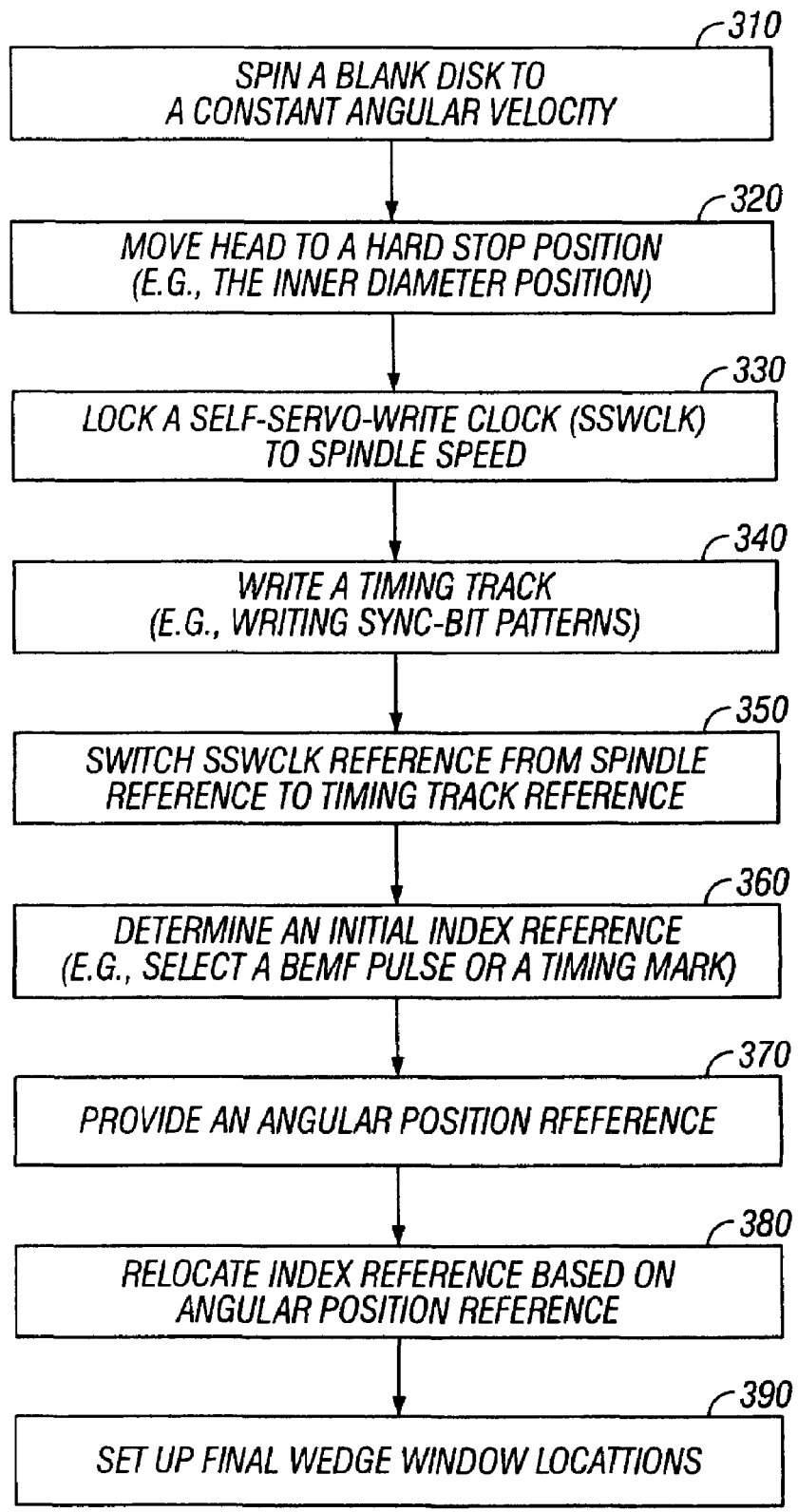
FIG. 3 shows a process of generating a timing reference signal based on a given rotational relationship between a blank disk and a transducer.

FIG. 3 shows a process of generating a timing reference signal based on a given rotational relationship between a blank disk and a transducer. A blank disk can be spun to a constant angular velocity at 310. The head can be moved to a hard stop position at 320. The description below assumes the hard stop position is the inner diameter (ID), but the systems and techniques described are equally applicable to using the outer diameter (OD) as the initial hard stop position. A self-servo-write clock (SSWCLK) can be locked to spindle speed at 330.

A timing track can then be written at 340, and the SSWCLK reference can be switched from the spindle reference to signals from the reference timing track at 350. These operations are fully optional, but may be very useful for heads with a write element further away from the hard stop than the read element (i.e., heads with a positive radial offset for write-read elements).

The written timing track contains a timing reference. For example, writing the timing track can involve writing two or more sync-bit patterns in the timing track, which can include using a Manchester (biphase) code, as described further below. The head can be moved away from the hard stop after writing the timing track, and the head's read element can then be servo-locked onto one edge of the timing reference track. In some implementations, writing the initial timing track need not be done, such as when the read-write elements on the head have near zero offset at the hard stop position.

An initial index reference can be determined at 360. This can involve selecting as the initial index reference one of the Back Electromotive Force (BEMF) pulses around one revolution of the disk when no timing track is used. When SSWCLK is locked to a timing track, this can involve selecting one of the timing marks on the timing track to be used as the initial index reference.

With the initial index reference determined, an angular position reference can be provided at 370. For example, one or more counters running on SSWCLK can be set up to provide the angular position reference. These counter(s) can include two modulo counters. A first such modulo counter can be a sub-wedge modulo counter whose modulo value is set to half the target number of clocks between two consecutive servo wedges (i.e., a half wedge spacing scheme). Other spacing schemes are also possible. A second such modulo counter can be a wedge-count modulo counter whose count keep tracks of the half-wedge numbers. For example, the wedge-count modulo counter can update its value when the sub-wedge modulo counter wraps its value around.

In addition, providing the angular position reference can involve performing a one time initialization of the angular position reference counters right after an arrival of the initial index reference. The index reference can then be relocated to a unique once-around-the-disk count position defined by the angular position reference counters at 380. For example, the index reference can be reset to the zero count position of both modulo counters, if desired.

Final wedge window locations can be set up at 390. For example, this can be defined as a fixed length region initiated when the sub-wedge modulo count value hits a preset number, and when the wedge-count modulo counter is on one of an even or odd number.

Figure 4:
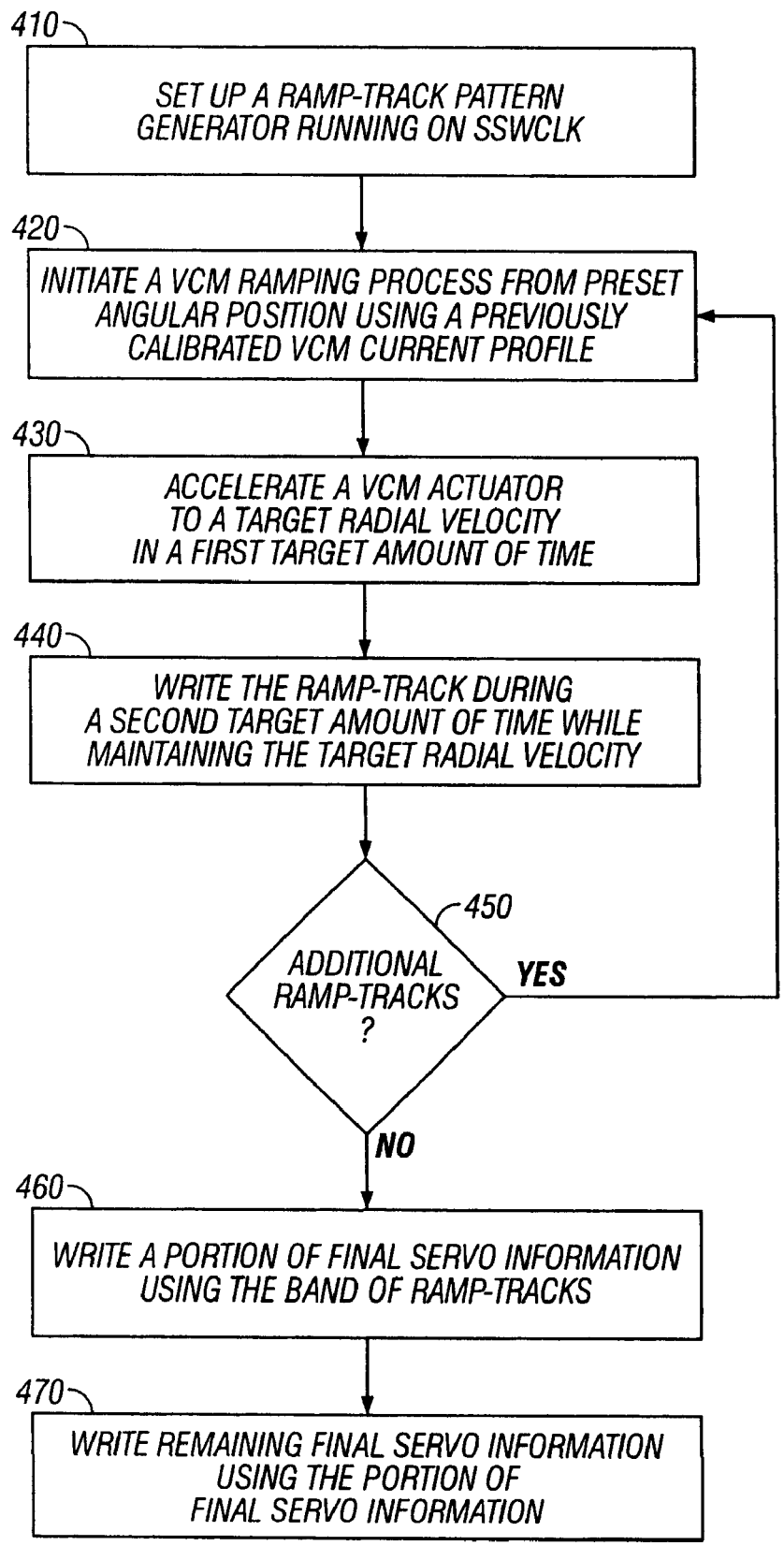
FIG. 4 shows a process of writing a band of ramp-tracks and writing servo information using a band of ramp-tracks.

FIG. 4 shows a process of writing a band of ramp-tracks and writing servo information using a band of ramp-tracks. A ramp-track pattern generator running on SSWCLK can be set up at 410. The ramp-track pattern can include a mostly sync-field pattern with sync-bits uniformly interspersed. The sync-bits need not be all of the same type. Having at least two different types of sync-bits can be desirable: one to provide index referencing, the other for general timing marks. Moreover, having a 3rd type of sync-bits can provide additional robustness in the system. Such sync-bits can be placed once every wedge distance, right inside or near the region defined by the wedge window position.

A VCM ramping process can be initiated from a preset angular position using a previously calibrated VCM current profile at 420. The previously calibrated VCM current profile can be based on a study made using the same type of mechanical component as used in the disk drive. A VCM actuator can be accelerated to a target radial velocity in a first target amount of time at 430. The ramp-track can then be written during a second target amount of time while maintaining the target radial velocity at 440. The write head can be turned on during this second period of time with write-protect turn-off during the wedge-window period. The VCM can then be retracted.

While additional ramp-tracks remain to be written at 450, the remaining ramp-tracks can be written in the same manner as above, starting from different but equally spaced angular positions. In each case, writing the ramp-track can involve operating a head and spindle motor control assembly under an open-loop condition for a short time duration, as shown and described.

Once the full set of ramp-tracks have been written, a portion of final servo information can be written using the band of ramp-tracks at 460. And remaining final servo information can be written using the portion of final servo information at 470. This can involve, iteratively, writing a next band of ramp-tracks using a previously written portion of the final servo information as a reference, and writing a next portion of the final servo information using a previously written band of ramp-tracks as a reference. In this implementation, the write-protect turn-off during the wedge-window period may be skipped during the writing of the first set of ramp-tracks, but then used during the writing of the remaining sets of ramp-tracks.

Figure 5:
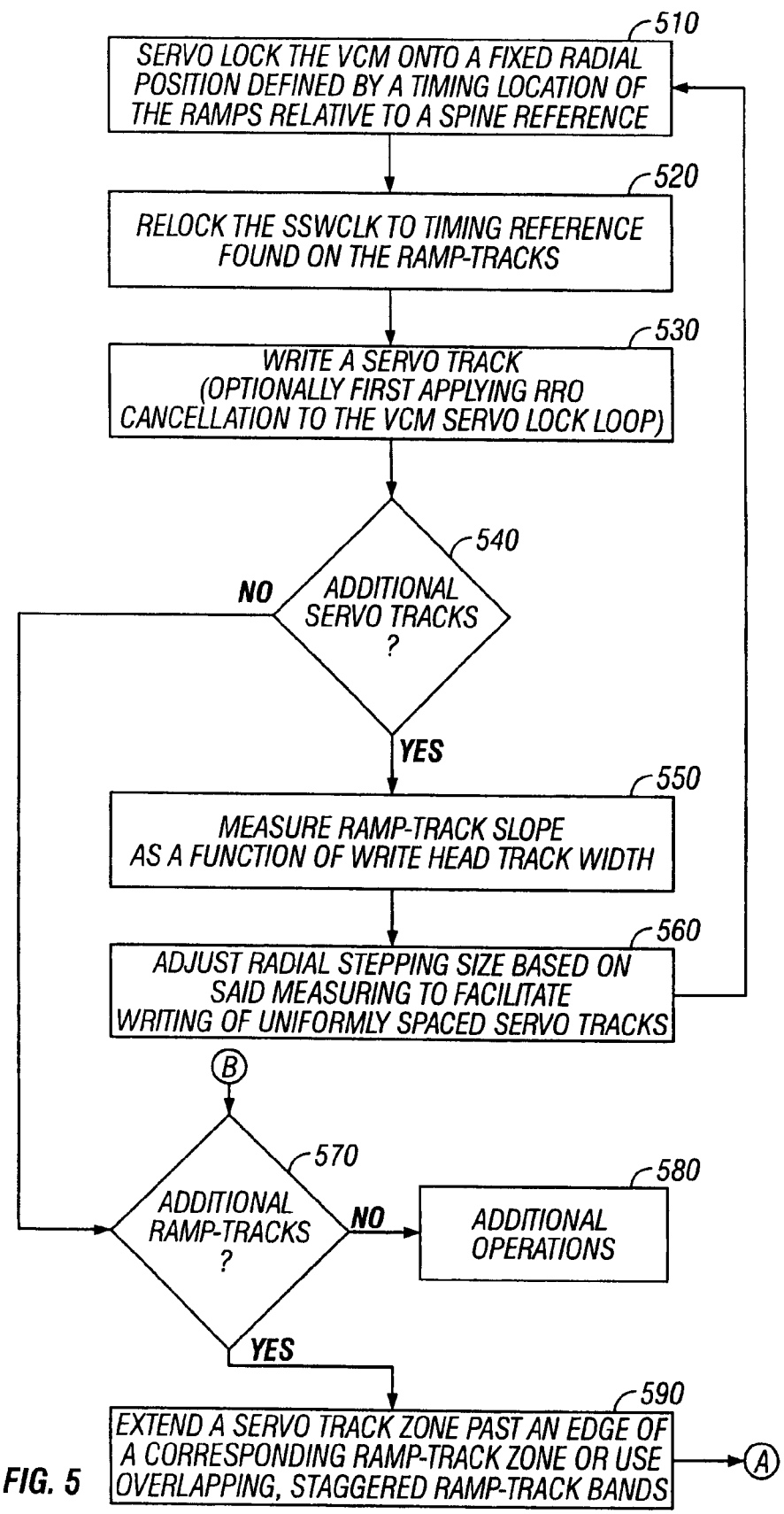
FIGS. 5-6 show a process of writing servo information using a band of ramp-tracks.
Figure 6:
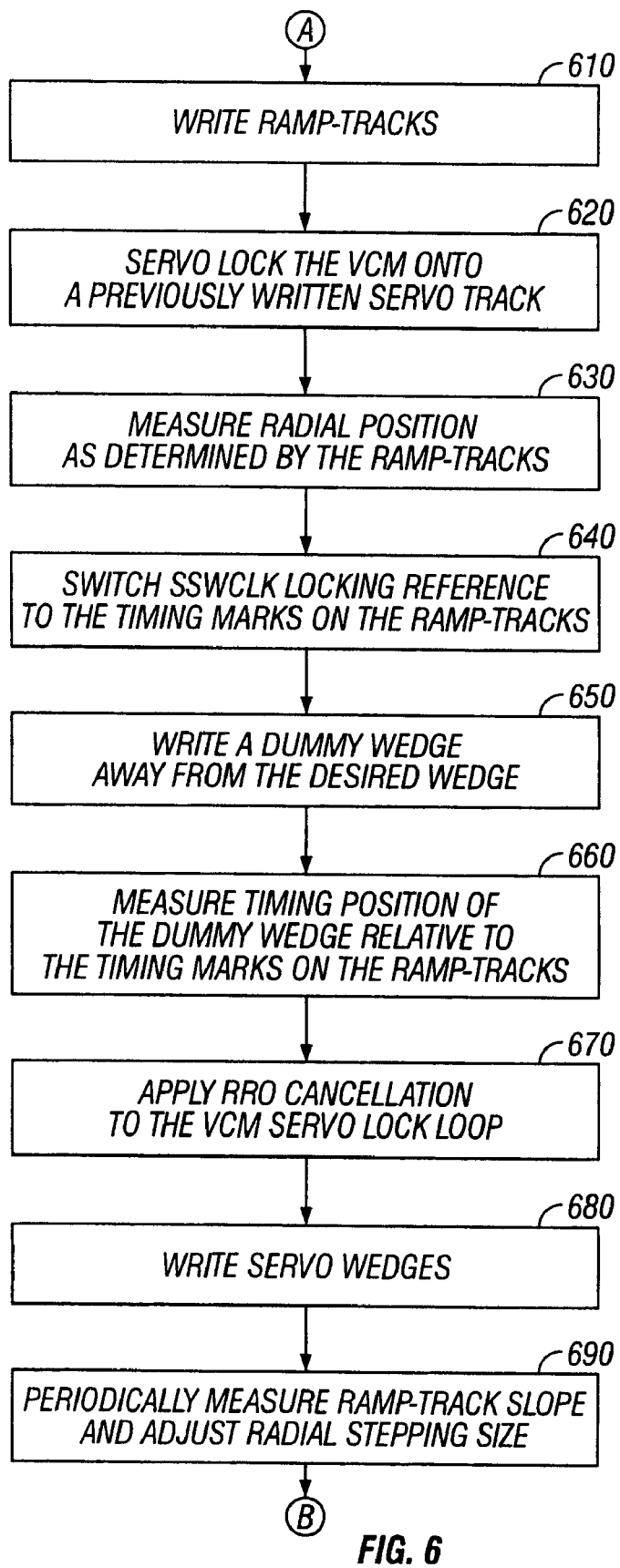

FIGS. 5-6 show a process of writing servo information using a band of ramp-tracks. A VCM can be moved gently from near the hard stop position into the ramp-track region. When the read electronics have detected most of the ramp-tracks, the VCM can be servo locked onto a fixed radial position defined by a timing location of the ramps relative to a spindle reference at 510. The SSWCLK can be relocked to the timing reference found on the ramp-tracks at 520. Note that the ramp-tracks and the timing track can be written using the same pattern generator in order to minimize transient in the SSWCLK during the switch over.

Optionally, repeatable run out (RRO) cancellation can be applied to the VCM servo lock loop to minimize the repeatable component of VCM current variation around every revolution. The RRO cancellation used can be that described in U.S. Pat. No. 6,775,091, entitled "Repeatable run-out compensation for disk drive", which is hereby incorporated by reference. A servo track is written at 530. A servo track can be written in multiple passes. For example, a servo track may require two or three passes of different write patterns to complete the writing. This can be initiated at every wedge window position.

While additional servo tracks remain to be written at 540, the servo writing continues. In addition, a ramp-track slope can be measured as a function of write head track width at 550; and a radial stepping size can be adjusted based on this measuring to facilitate writing of uniformly spaced servo tracks at 560. The VCM can be moved radially in such a way as to measure the written head track width. Even when the VCM velocity during ramp write has been previously calibrated, re-measuring the slope of the ramps as a function of the write track head width can provide additional accuracy.

This can result in at least two major benefits: (1) the calibration needed to even out residual variations during the ramp write process can be determined, and (2) how best to step the tracks can be determined since how many tracks can be written may depend on the width of the write head instead of a fixed stepping distance due to write head width variations.

The head can be stepped according to a normal servo stepping requirement to write as many servo tracks as can be supported by the ramp-tracks. The measurement of the ramp-track slope and adjustment to the radial stepping size can be done at various times and need not be done between the writing of each servo track as shown. Once no additional servo tracks are needed, the servo wedges within the first ramp-track band have been completed. However, servo tracks can also be written beyond the end of the ramp-tracks as discussed further below.

A check can be made regarding whether additional ramp-tracks are needed at 570. While additional ramp-tracks are needed, the process continues. Once all the servo tracks have been written to disk, any additional operations can be performed at 580. For example, various clean up and/or verification operations can be performed, such as doing read/write on the entire disk surface to certify the disk.

Performing the self-servo writing process can involve using overlapping ramp-tracks or not. In a non-overlapping approach, a servo track zone can be extended past an edge of a corresponding ramp-track zone at 590. This can be done as part of the self-servo writing process in order to prevent intersection of ramp-tracks from adjacent ramp-track zones. Alternatively, writing the bands of ramp-tracks can involve writing overlapping, staggered bands of ramp-tracks at 590, such that ramps from one band to a next band do not intersect. In general, the next set of ramp-tracks to be written cover a radial region that starts near the end of the previous set of ramp-tracks.

Figure 12:
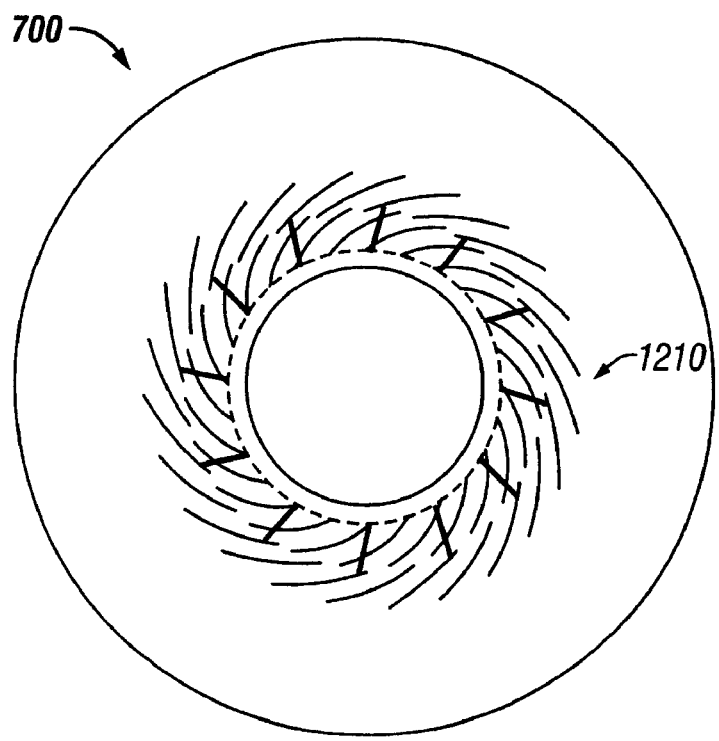
FIG. 12 shows the disk from FIG. 11 after a second set of ramp-tracks have been written in an overlapped and staggered fashion.

When the ramp-tracks are overlapped, the next set of ramps should be placed in angular positions that ensure no intersection of the current set of ramp-tracks with the previous set of ramp-tracks (e.g., a position that is half way in between the previous set of ramps, as shown in FIG. 12).

When the ramp-tracks are not overlapped, the servo track zone can be extended beyond the corresponding ramp-tracks, such as by using propagation SSW techniques to extend the first SSW servo band. Moreover, the outer band portion of the first ramp-tracks can be erased at the same time propagation SSW is preformed to reduce the number of extension tracks needed. The next set of ramp-tracks can thus be written without any radial overlap with the first set of ramp-tracks.

In either case, the process can continue through circle-A to FIG. 6, which shows a process that repeats until the whole disk is completely self-servo written with servo wedges.

A next set of ramp-tracks is written at 610. This can involve servo locking the VCM onto a previously written servo track. For example, the VCM can be servo locked so that the read head is positioned on a previously written servo track near the end of the previously written band at a radial position=RS2. The SSWCLK reference can be switched to the timing marks (sync-mark) in final servo wedges written in the previous radial band, taking into account the timing offset between the sync-marks in the servo wedges and the timing marks in the previous ramp-track region.

Starting from preset angular positions, the VCM actuator can be initiated such that it moves to a constant velocity before the head exits the first ramp-track zone. This can be done using open-loop calibrated impulse current through the VCM, or using closed loop control during the time the head flies over the previously written servo track. For example, in the overlapped ramp-track approach, the write head can start moving from a predetermined radial position RW2 (as feedback from previously written servo tracks) before it exits the previous ramp-track zone.

The ramp write can be terminated a fixed time later, and shortly after that the head can be retracted back to RS2 location. This can be repeated until all the ramp-tracks have been written. Additionally, in the overlapped ramp-track approach, write protect gating can be performed around the wedge window period, at least within the overlapped radial zone.

After each set of ramp-tracks is written, the next set of servo wedges is written. The following description is given in the context of the overlapped ramp-track approach, but the overall process is still applicable to the non-overlapped approach.

The VCM can be servo locked onto a previously written servo track within the overlapped zone at 620. Radial position as determined by the current set of ramp-tracks can be measured at 630. The difference between the radial position defined by the servo track and the radial position defined by the recently written set of ramp-tracks can provide the offset information used to continue with the self-servo-write of the servo tracks past the previously written zone without having to address radial stitching.

The SSWCLK locking reference can be switched to the timing marks on the second set of ramp-tracks at 640. A dummy wedge can be written away from the desired wedge location at 650. The timing position of the dummy wedge can then be measured relative to the timing marks on the ramp-tracks at 660. This information can provide the timing offset between the read and write elements. Adjustment can then be made to the SSWCLK to ensure that there is no timing coherence issue between the previous servo tracks and the newly written servo tracks.

An RRO cancellation can be applied to the VCM servo lock loop at 670 to minimize the repeatable component of VCM current variation around every revolution. The servo wedges are written at 680. This can involve stepping through the radius within the current set of ramp-tracks and writing servo wedges as described above. In addition, as before, periodic measurement of ramp-track slope and adjustment of radial stepping size can be performed at 690. The process continues, through circle-B to FIG. 5, until all the servo information has been written.

Figure 7:
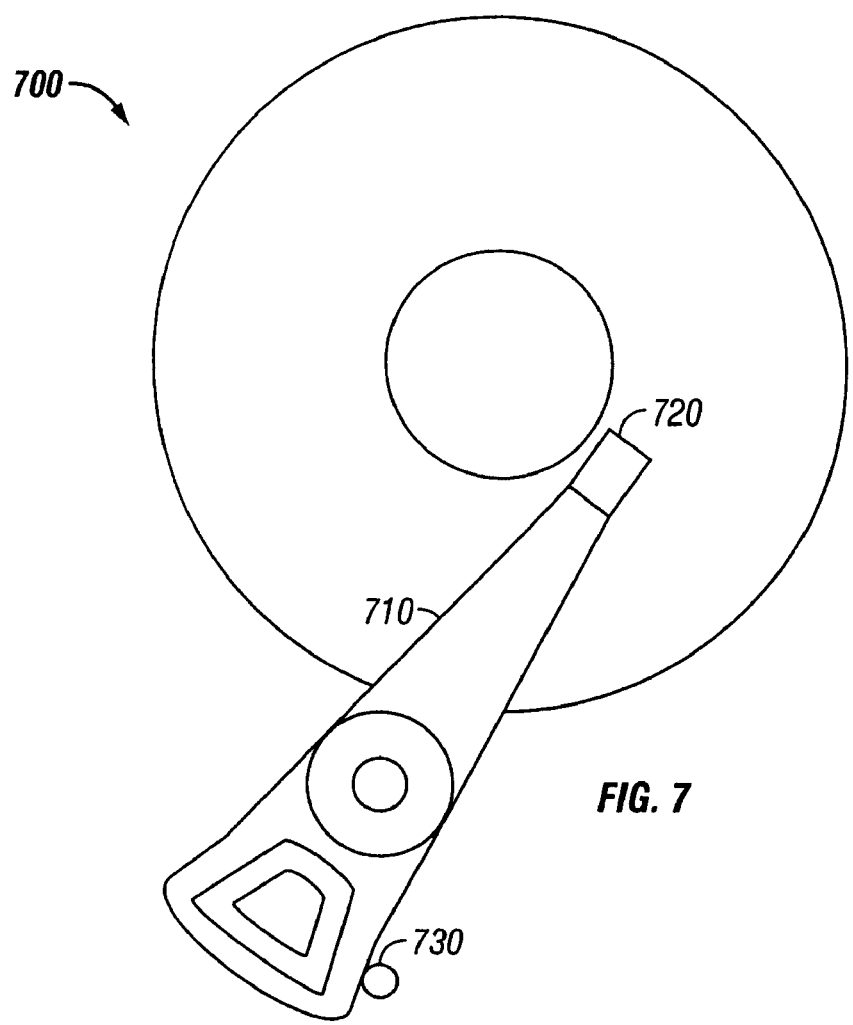
FIG. 7 shows an example blank disk.
Figure 8:
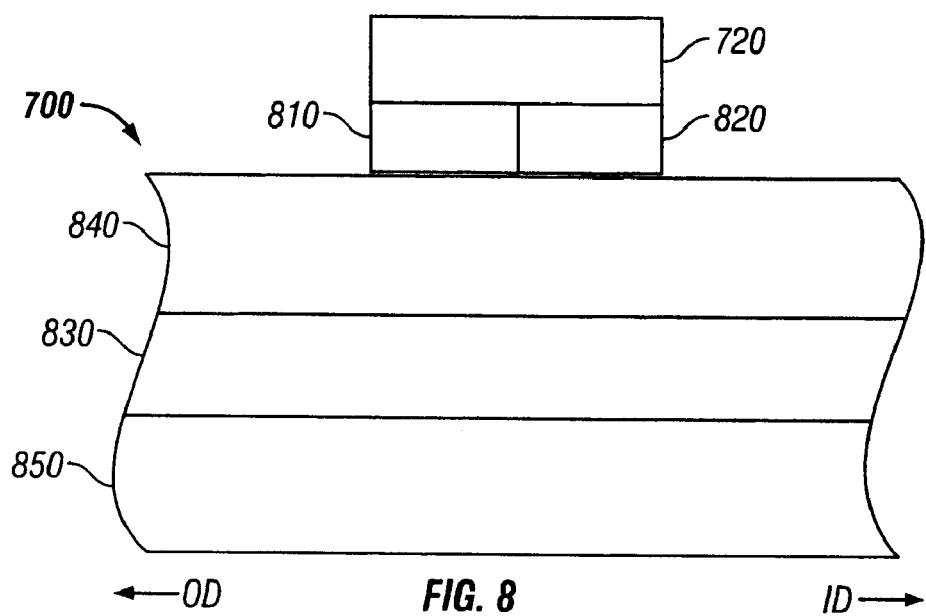
FIG. 8 shows a cutaway view of the disk and read head from FIG. 7.

FIGS. 7-14 show an example of the overlapped ramp-track approach to self-servo writing. A blank disk 700 is shown in FIG. 7, with a head 720 on an arm 710 positioned against a hard stop 730. FIG. 8 shows a cutaway view of the read head 720 positioned over a portion of the disk 700 from a perspective of being at the end of the read head 720 and looking back up the arm 710. ID is to the right in FIG. 8 and OD is to the left in FIG. 8.

The head 720 can include a write element 810 and a read element 820 with a positive radial offset as shown. The disk 700 can include one or more layers. For example, the disk 700 can be a perpendicular magnetic recording (PMR) disk that includes a high permeability ("soft") magnetic under-layer 830 between a perpendicularly magnetized thin film data storage layer 840 and a substrate 850. Other disk writing technologies can also be used, such as traditional longitudinal magnetic recording.

Figure 9:
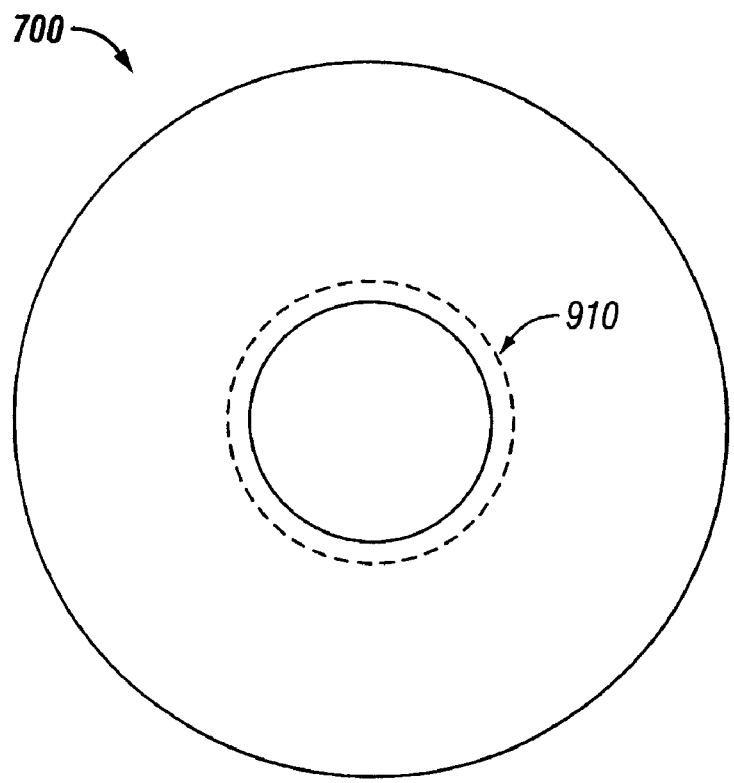
FIG. 9 shows the disk from FIG. 7 after a timing track has been written.
Figure 10:
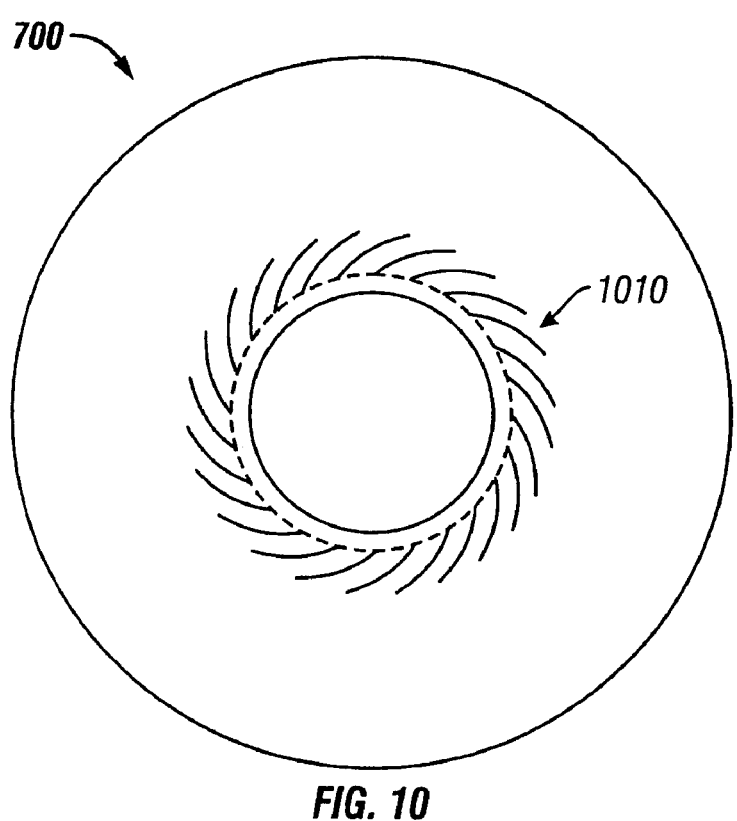
FIG. 10 shows the disk from FIG. 9 after a first set of ramp-tracks have been written.
Figure 11:
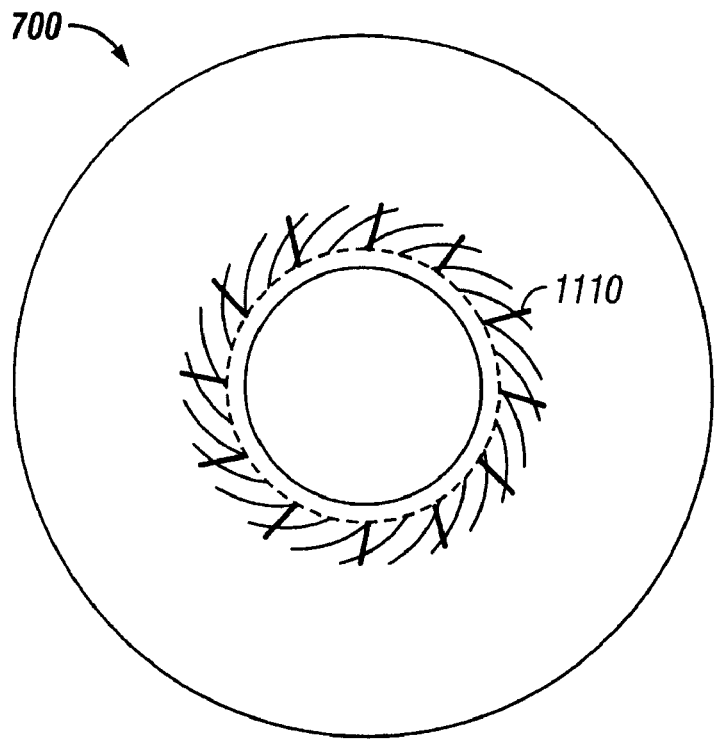
FIG. 11 shows the disk from FIG. 10 after a first portion of the final servo wedges have been written.
Figure 13:
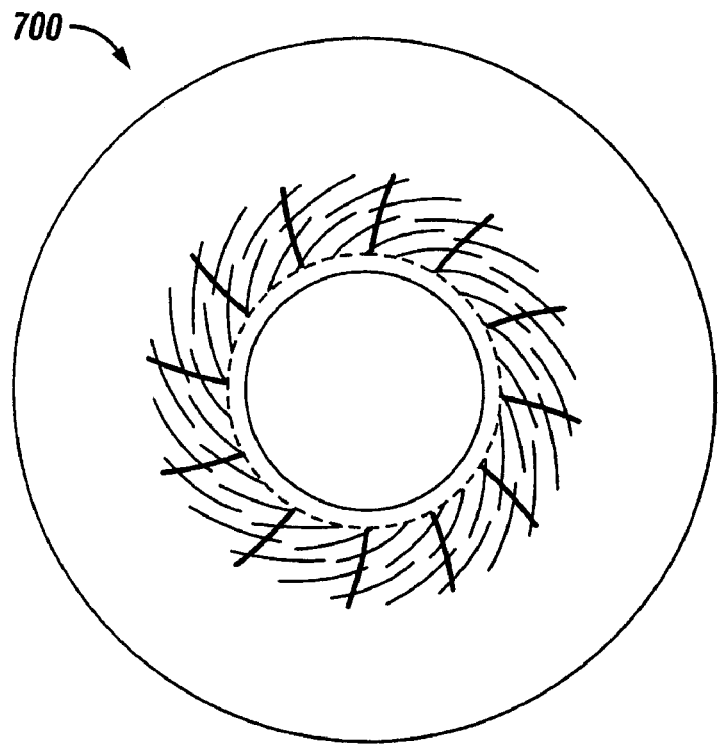
FIG. 13 shows the disk from FIG. 12 after a second portion of the final servo wedges have been written.
Figure 14:
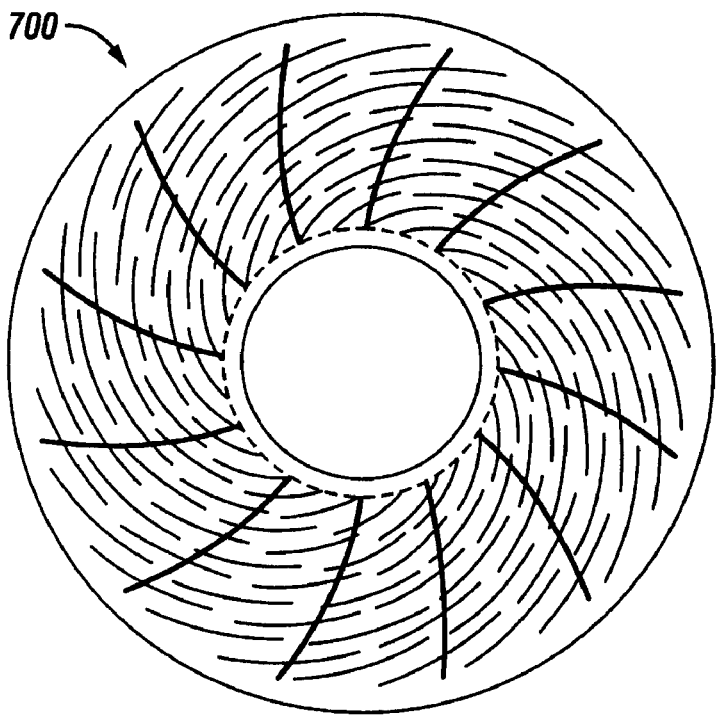
FIG. 14 shows the disk from FIG. 13 after all the ramp-tracks and final servo wedges have been written.

FIG. 9 shows the disk 700 after a timing track 910 has been written. FIG. 10 shows the disk 700 after a first set of ramp-tracks 1010 have been written. FIG. 11 shows the disk 700 after a first portion of the final servo wedges (e.g., wedge 1110) have been written. FIG. 12 shows the disk 700 after a second set of ramp-tracks 1210 have been written in an overlapped and staggered fashion. FIG. 13 shows the disk 700 after a second portion of the final servo wedges have been written. FIG. 14 shows the disk 700 after all the ramp-tracks and final servo wedges have been written.

Thus, the multi-ramp self-servo-write scheme involves writing a set of short to intermediate length servo reference traces that ramp from a position at or near a hard stop position (radius) to another radius. Each set of ramp-tracks does not extend all the way to the other side of the disk. For example, each set of ramp-tracks may span less than half, less than third, less than fourth, or less than eighth a distance from an inner diameter to an outer diameter of the machine-readable medium. In general, the dimensions of the ramp-tracks used can be inversely proportional to the tolerance of the VCM control. For example, if the VCM control and spindle have a tolerance of 1%, then the ramp-tracks can span a distance of about one hundred final servo tracks. In general, the span of a set of ramp-tracks can be less than or equal to one thousand final servo tracks, less than or equal to one hundred final servo tracks, or in the range of three to ninety final servo tracks.

The first set of ramp-tracks can be used to provide the position and timing reference used for self-servo-writing of a small band of final servo tracks and wedges. The servo-wedges written in this way cover a radial range spanned by the ramp-track zone. Then another set of reference ramps can be written, with starting radius located on one of the written servo tracks to serve as the bootstrapped position. This second set of reference ramps can then be used to extend the written servo tracks further to the outer edge of the new ramps. This process can be continued until the whole disk is written with final servo tracks.

All the electronics that perform these self-servo-write operations can be included in the electronics that support normal drive operation, such that a disk drive can perform self-servo-write and self-test without the aid of additional hardware outside the HDA and PCBA.

Figure 15:
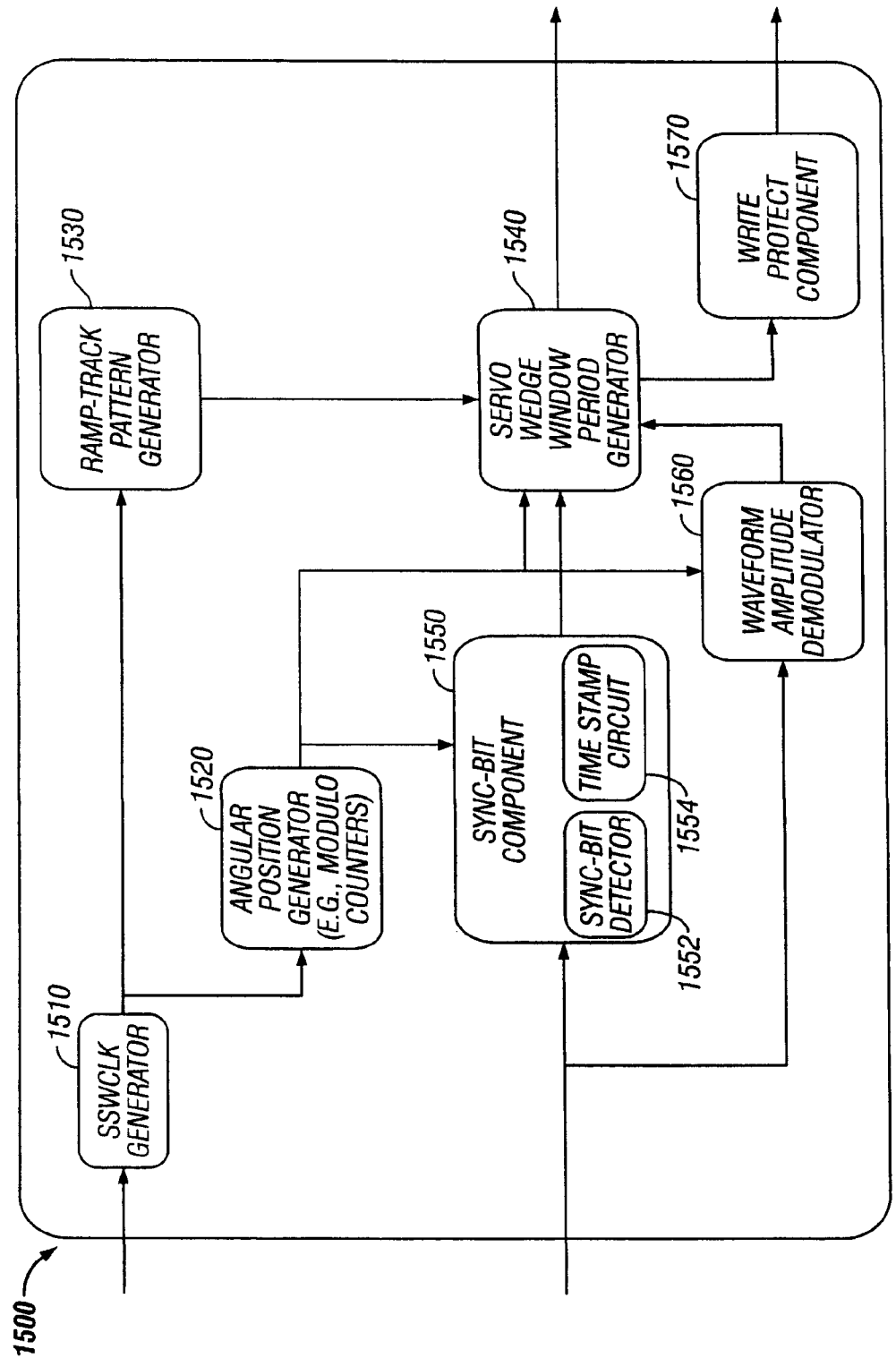
FIG. 15 is a block diagram showing an example ramp-track self-servo-write controller.

FIG. 15 is a block diagram showing an example ramp-track self-servo-write controller 1500. An SSWCLK generator 1510 is configured to be locked to spindle speed and may be controllable by a processor running software or firmware. An angular position generator 1520 is responsive to the SSWCLK generator 1510 and may include multiple modulo counters. A ramp-track pattern generator 1530 is responsive to the SSWCLK generator 1510 and may be configured to produce multiple sync-field patterns. A servo wedge window period generator 1540 is responsive to the angular position generator 1520 and can run synchronously to the disk.

The pattern generator 1530 can also be configured to be used in writing both ramp-tracks and an initial timing track. The sync-field pattern(s) produced by the pattern generator 1530 can include uniformly interspersed timing marks and can use one or more types of sync-bit patterns. Manchester (biphase) code can be used for encoding the sync-field and sync-bits. An example sync field is all "1'"s Manchester data bits, with a Manchester "1" defined as a 1100 NRZ (No Return to Zero) pattern (each NRZ bit being one SSWCLK), and a manchester value of 0 defined as a 0011 NRZ pattern. Examples of sync-bit patterns are (in terms of Manchester bits): (a) 1101, (b) 1001, etc. One sync-bit pattern can be used for the index mark (which occurs once per revolution), and any additional sync-bit patterns can be used for higher frequency timing marks.

The SSW controller 1500 can also include a sync-bit component 1550 configured to identify sync-bits in a readback waveform obtained from the recording medium. The sync-bit component 1550 can include one or more sync-bit pattern detectors and timestamp circuits 1552, 1554 configured to detect locations of sync-bits relative to rotational angle of the recording medium. A waveform amplitude demodulator 1560 can be included and be configured to measure ramp-track shape as the read head crosses the ramp-tracks. Additionally, a write protect component 1570 can be included and be responsive to the servo wedge window period generator 1540 and can be tied to the wedge window period.

Figure 16:
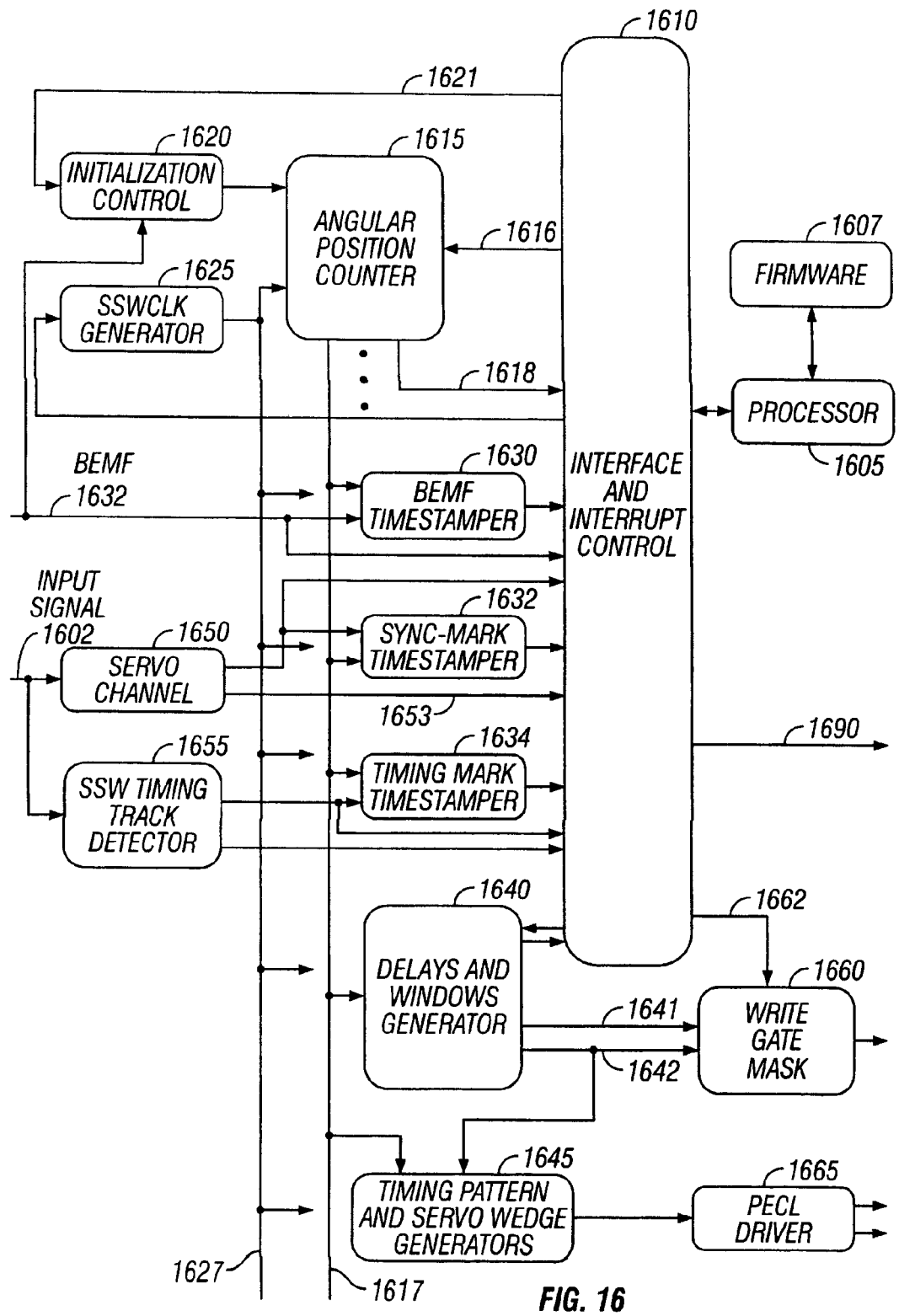
FIG. 16 is a block diagram showing another example ramp-track self-servo-write controller.

FIG. 16 is a block diagram showing another example ramp-track self-servo-write controller. A processor 1605 (e.g., a microprocessor/microcontroller) can perform computations as needed using software or firmware 1607. An interface and interrupt control 1610 provides an interface between the processor 1605 and other components of the SSW controller.

An angular position counter 1615 receives counter parameters on a line 1616 and provides an index pulse on a line 1618, both coupled to the interface and interrupt control 1610. The angular position counter 1615 also provides an angular position value on a line 1617. Moreover, additional similar counters can be included in the SSW controller.

An initialization control 1620 receives an index initialization on a line 1621 and receives BEMF pulses on a line 1632 (e.g., from the motor driver). A high resolution SSWCLK generator 1625 can be controlled by the processor 1605 and provides a clock signal to an SSWCLK line 1627. Multiple counters can be clocked by SSWCLK, running synchronously to the disk, and can be used to define the angular position of the recording disk. The counters can be programmed to have a complete period covering one revolution of the disk.

A spindle BEMF timestamper 1630 can measure the BEMF edges in terms of the angular position defined by the synchronous counter(s), providing the location information of the BEMF pulses consistent with the angular position used by the SSW processes. This timestamp circuit need not have resolution higher than the SSWCLK period since the BEMF pulses usually have larger uncertainties than one SSWCLK period.

A signal from the read head can be received on a line 1602 and provided to a servo channel 1650 and an SSW timing track detector 1655. The servo channel 1650 can provide servo gray code and Position Error Signal (PES) Demod Values to the interface and interrupt control 1610 on a line 1653 (see e.g., U.S. Pat. No. 6,775,338, entitled "Digital servo channel for recording apparatus"). The servo channel 1650 can also provide a servo mark (SM) detect signal to the interface and interrupt control 1610 and to a high resolution sync-mark timestamper 1632 used to detect the location of sync-marks from servo wedges.

A high resolution timing mark timestamper 1634 can be used to detect the location of timing marks relative to the rotation angle. The resolution should be in a resolution substantially smaller than the period of one SSWCLK. The SSW timing track detector 1655 can provide timing mark (TM) type information to the interface and interrupt control 1610 and also TM detect information to both the interface and interrupt control 1610 and the timing mark timestamper 1634.

A delays and windows generator 1640 can interact with the interface and interrupt control 1610, a write gate mask 1660, and a timing pattern and servo wedge generator(s) 1645. Target values can be provided from the interface and interrupt control 1610 to the delays and windows generator 1640, and timing and window pulses can be provided from the delays and windows generator 1640 to the interface and interrupt control 1610. In addition, a ramp WGATE signal can be provided on a line 1641 and a wedge window signal can be provided on a line 1642.

The write gate mask 1660 can receive a write mask enable signal on a line 1662. The write gate mask 1660 can include a write enable circuit with programmable turn-on and turn-off time relative to disk angular position, such as defined by the counter(s), and also a write protect circuit tied to the wedge window period. If enabled, the write protect circuit disables writing to the disk even during the write-enable period defined by the write enable circuit.

Output (WGATE) of the write gate mask 1660 can be provided to a preamp control. Additionally, output of a PECL (positive emitter coupled logic) driver 1665 can be provided to preamp write input pins.

Figure 17:
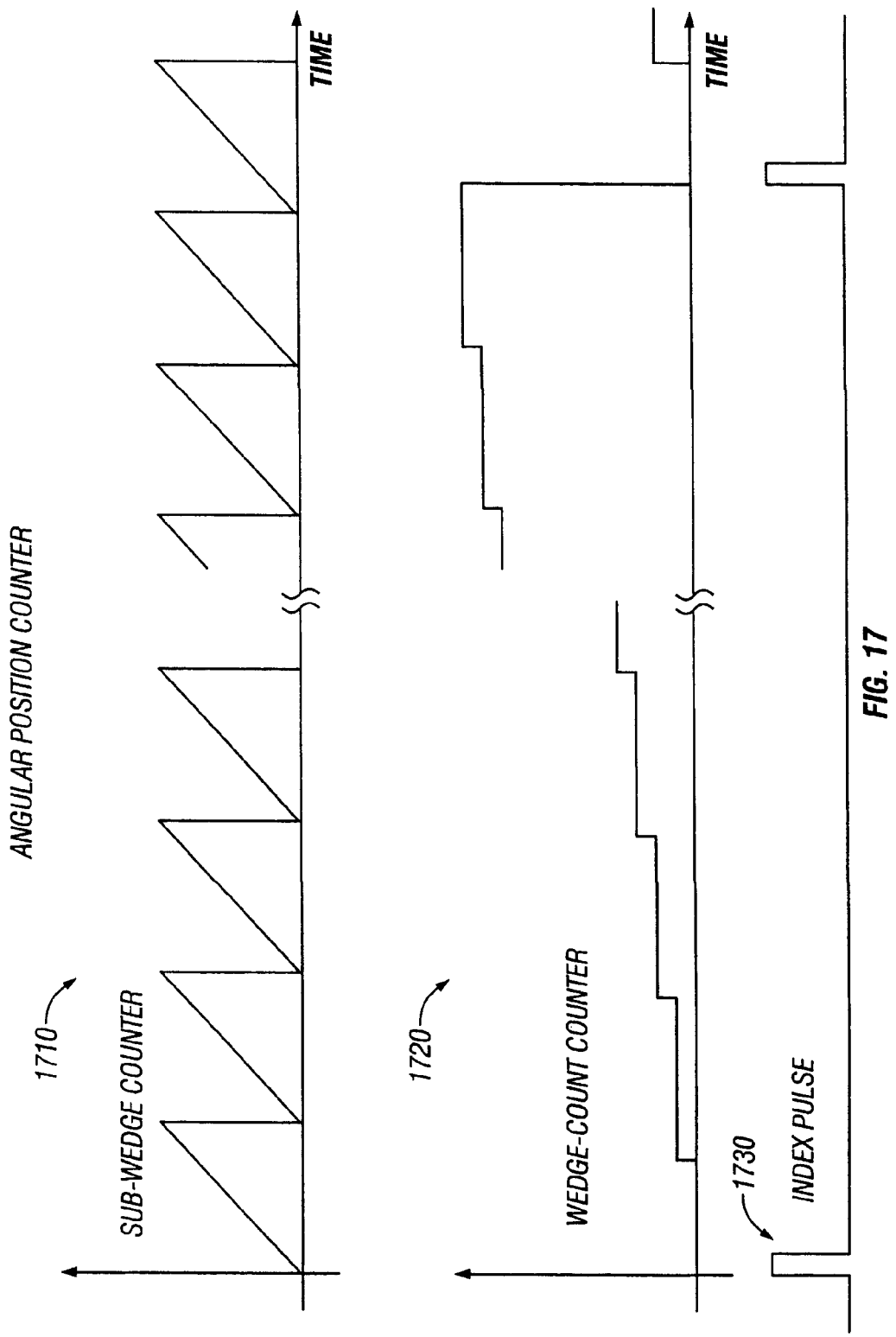
FIG. 17 shows example timing of a sub-wedge counter and a wedge-counter with reference to an index pulse.

FIG. 17 shows example timing of a sub-wedge counter 1710 and a wedge-counter 1720 with reference to an index pulse 1730. The sub-wedge counter 1710 and the wedge-counter 1720 combine to form an angular position counter.

Figure 18:
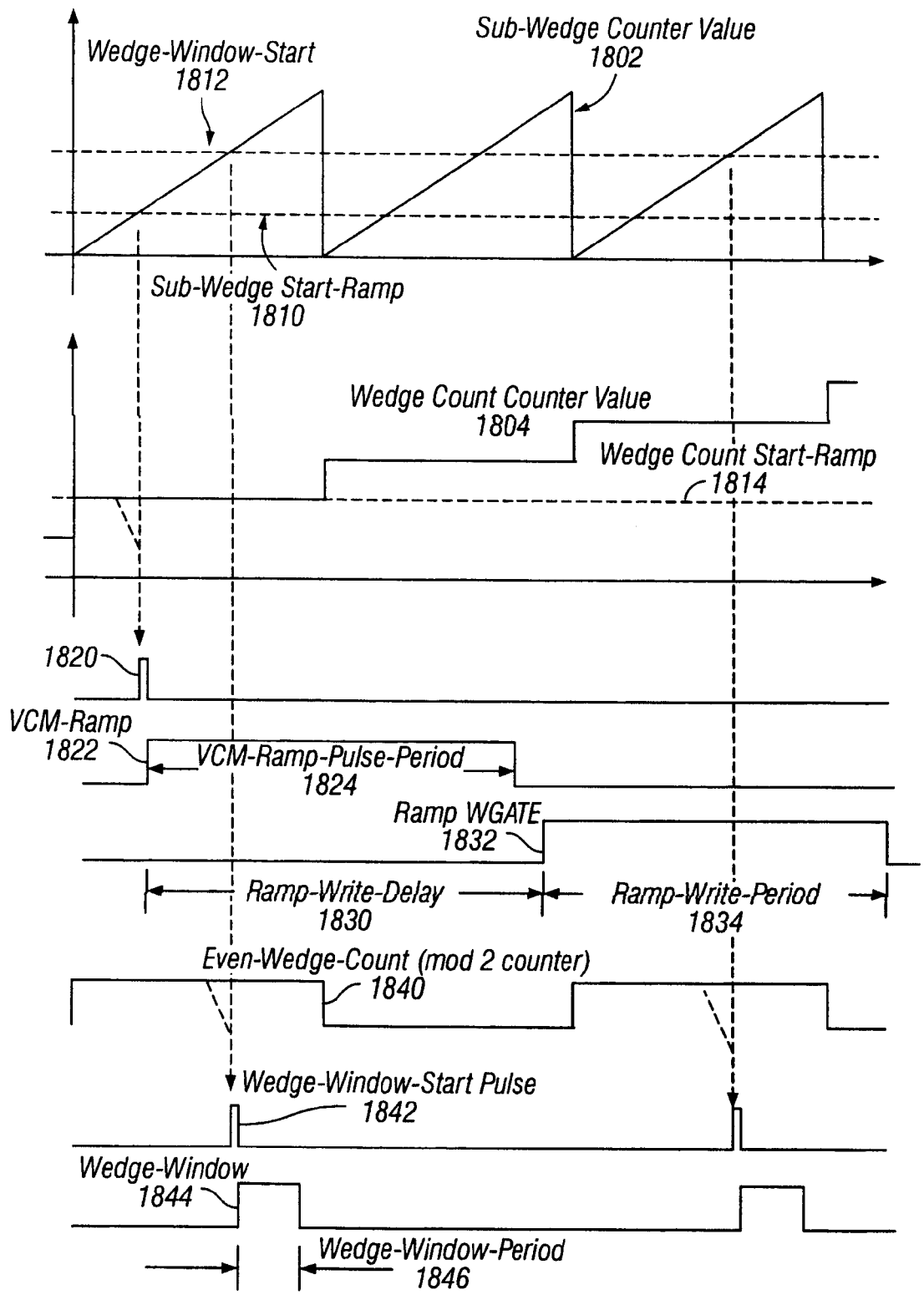
FIG. 18 shows example delays and windows generator timing waveforms.

FIG. 18 shows example delays and windows generator timing waveforms. A sub-wedge counter value 1802 and a wedge-count counter value 1804 can be used in controlling writing of the ramp-tracks. As shown, a sub-wedge-start-ramp 1810 and a wedge-count-start-ramp 1814 trigger a VCM-ramp pulse 1820, which starts a VCM-ramp signal 1822 lasting for a VCM-ramp-pulse-period 1824. After a ramp-write-delay 1830, a ramp WGATE signal 1832 lasts for a ramp-write-period 1834. A wedge-window-start 1812 and an even-wedge-count 1840 (a mod 2 counter) trigger a wedge-window-start pulse 1842, and a wedge-window 1844 lasts for a wedge-window-period 1846.

Figure 19:
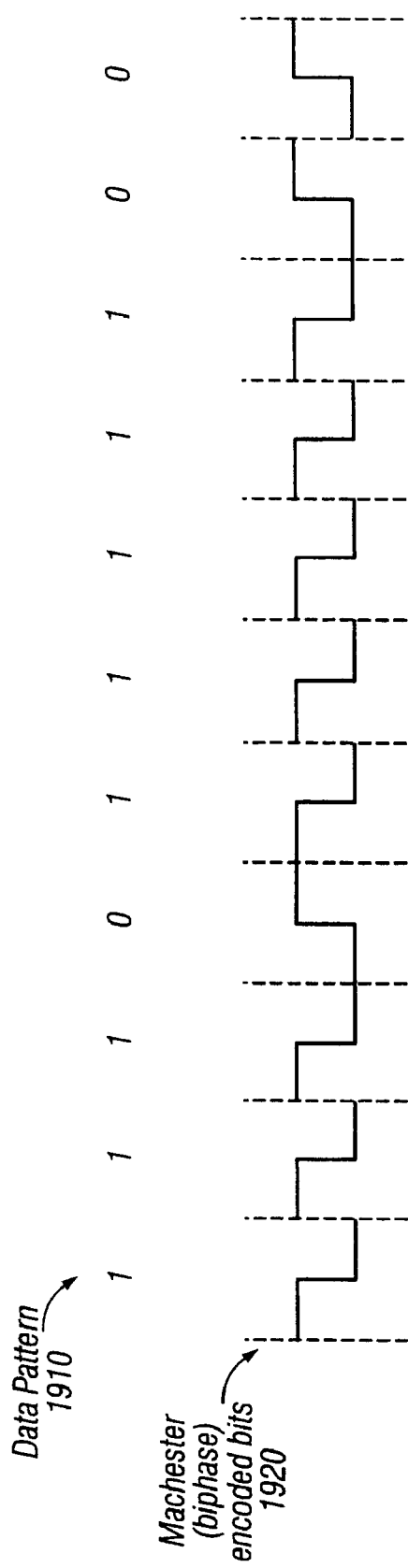
FIG. 19 shows an example Manchester (biphase) encoded write waveform.

FIG. 19 shows an example Manchester (biphase) encoded write waveform. A data pattern 1910 corresponds to Manchester (biphase) encoded bits 1920.

Figure 20:
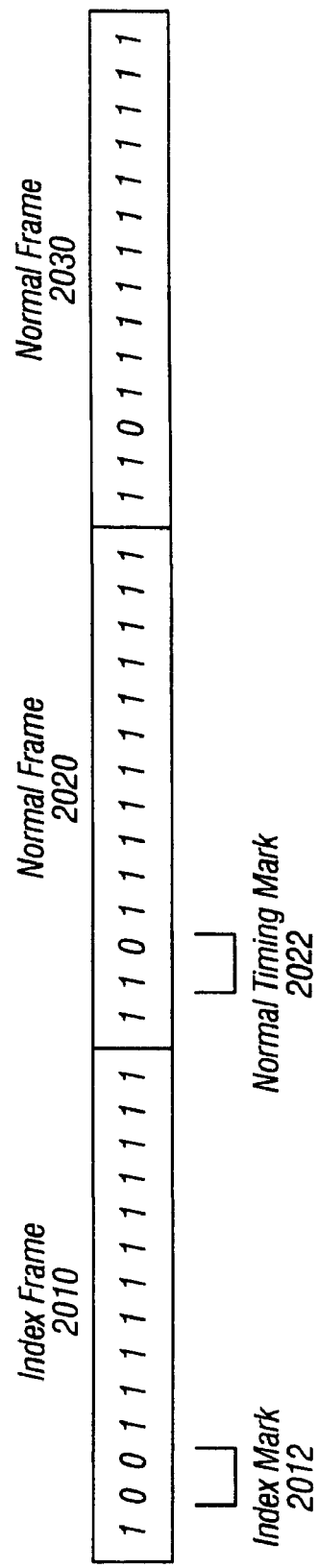
FIG. 20 shows an example timing track pattern.

FIG. 20 shows an example timing track pattern, which includes an index frame 2010 and normal frames 2020, 2030. The index frame 2010 includes an index mark portion 2012. A normal frame 2020 includes a normal timing mark portion 2022. This example timing track waveform can also be used for ramp-tracks.

Figure 21:
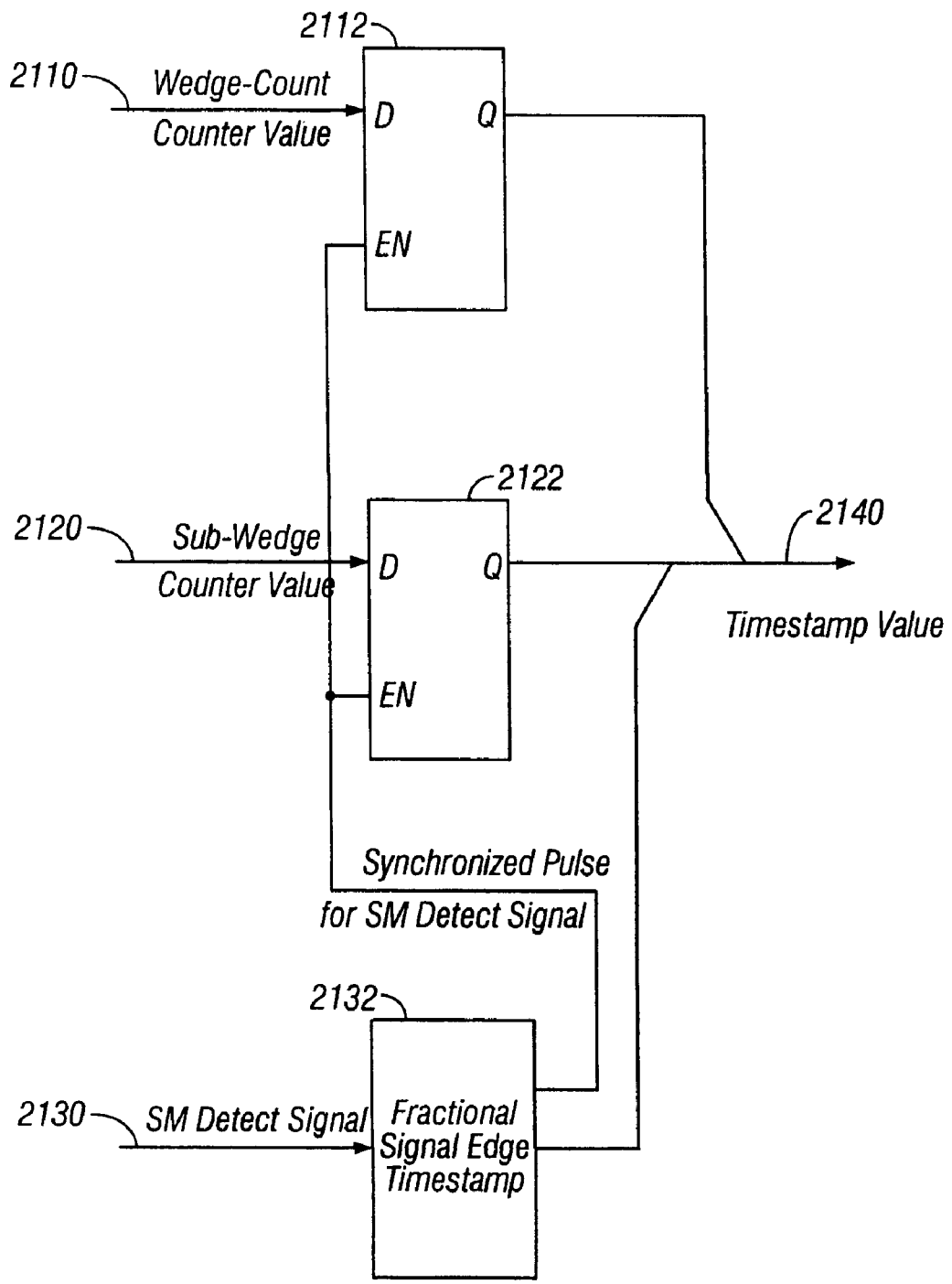
FIG. 21 shows an example high resolution timestamp circuit.

FIG. 21 shows an example high resolution timestamp circuit. The example shown is for SM detect signal edge, but similar structures can be used for the other timestampers. A wedge-count counter value 2110 is provided to a first latch 2112. A sub-wedge counter value 2120 is provided to a second latch 2122. An SM detect signal 2130 is provided to a fractional signal edge timestamp 2132, which outputs a synchronized pulse for SM detect signal to the enable lines of the latches 2112, 2122. An output 2140 provides the timestamp value.

Figure 22:
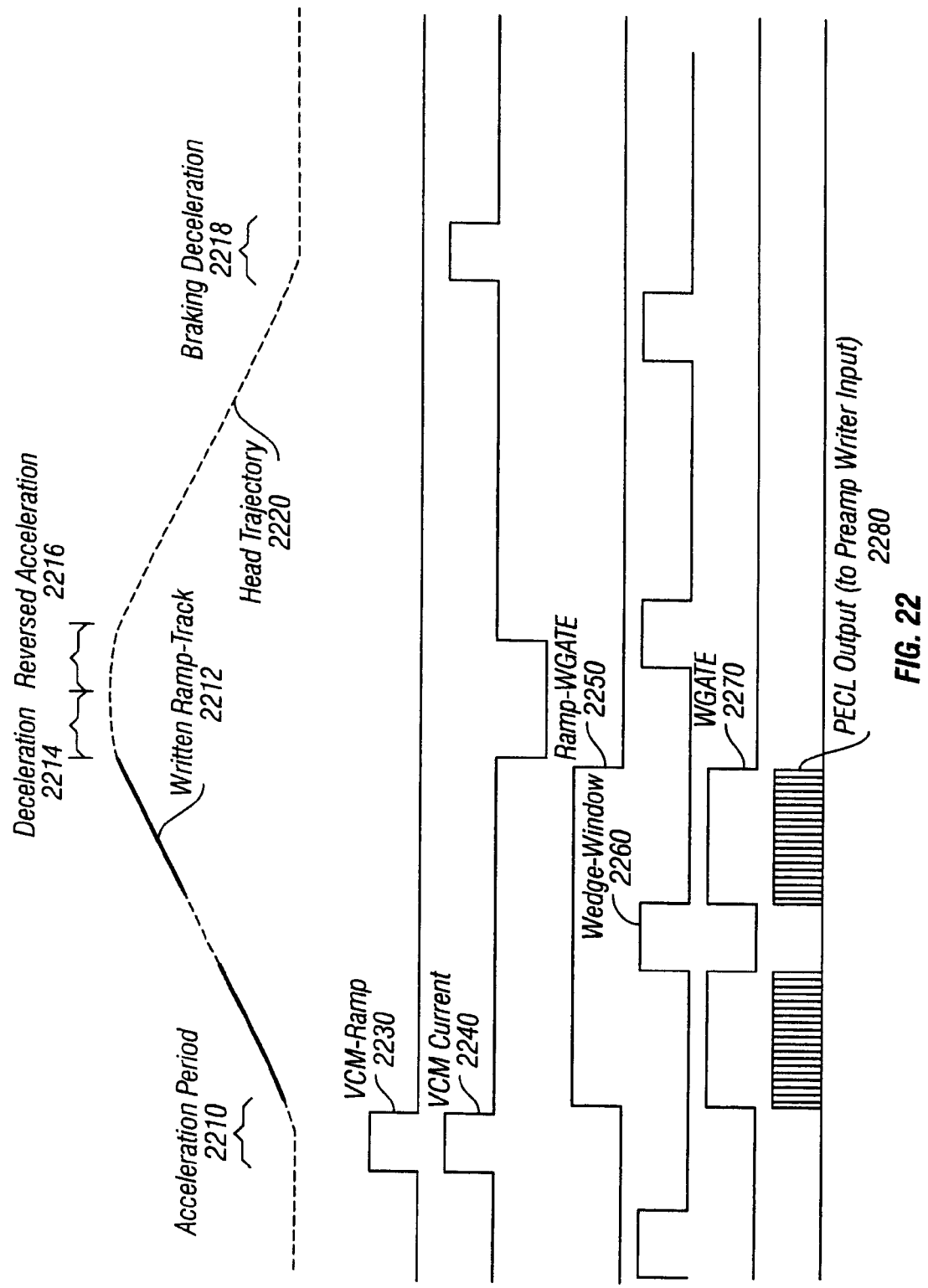
FIG. 22 shows an example of ramp-track writing timing waveform.

FIG. 22 shows an example of ramp-track writing waveform timing. A ramp-track 2212 is written between an acceleration period 2210 and a deceleration period 2214. The head trajectory 2220 between a reversed acceleration period 2216 and a braking deceleration period 2218 is also shown. FIG. 22 also shows the timing of various signals: a VCM-ramp signal 2230, a VCM current signal 2240, a ramp-WGATE signal 2250, a wedge-window signal 2260, a WGATE signal 2270, and a PECL output (to preamp writer input) signal 2280.

FIG. 23 shows an expanded view of example ramp-tracks 2310. As shown, within a wedge-window period 2320, a servo wedge 2330 can be placed between the ramp-tracks.

A few embodiments have been described in detail above, and various modifications are possible. The disclosed subject matter, including the functional operations described in this specification, can be implemented in electronic circuitry, or in computer hardware, firmware, software, or in combinations of them, such as the structural means disclosed in this specification and structural equivalents thereof, including potentially a software program operable to cause one or more machines to perform the operations described. It will be appreciated that the order of operations presented is shown only for the purpose of clarity in this description. No particular order is required for these operations, and some or all of the operations may occur simultaneously in various implementations. Moreover, not all of the operations shown need be performed to achieve desirable results.

Other embodiments fall within the scope of the following claims.

What is claimed is:

1. An apparatus comprising:
   a recording disk;
   a transducer configured to write to the recording disk; and
   a self-servo-write controller configured to cause performance of post-assembly operations comprising writing a band of ramp-tracks to the recording disk starting from a hard-stop position, each ramp-track spanning less than half a distance from an inner diameter to an outer diameter of the recording disk, and writing servo information to the recording disk using the band of ramp-tracks as a seed.

2. The apparatus of claim 1, wherein the self-servo-write controller is configured to cause writing the servo information by causing operations comprising: writing a first portion of servo information to the recording disk using the band of ramp-tracks, and writing a second portion of servo information to the recording disk using the first portion of servo information.

3. The apparatus of claim 2, wherein the self-servo-write controller is configured to cause writing the second portion of servo information by causing operations comprising: writing a next band of ramp-tracks using a previously written portion of the servo information as a reference, and writing a next portion of the servo information using a previously written band of ramp-tracks as a reference.

4. The apparatus of claim 3, wherein the self-servo-write controller is configured to cause writing of each of the first portion and the next portion of the servo information by extending a servo track zone past an edge of a corresponding ramp-track zone to prevent intersection of ramp-tracks from one ramp-track zone with ramp-tracks from a previous ramp-track zone.

5. The apparatus of claim 1, wherein the self-servo-write controller is configured to cause writing a ramp-track by initiating a Voice-Coil Motor (VCM) ramping process from a preset angular position using a previously calibrated VCM current profile, the VCM ramping process comprising: accelerating a VCM actuator to a target radial velocity in a first target amount of time, and writing the ramp-track during a second target amount of time while maintaining the target radial velocity.

6. The apparatus of claim 1, wherein the self-servo-write controller is configured to cause performance of the post-assembly operations comprising writing overlapping, staggered bands of ramp-tracks such that ramp-tracks from one band do not intersect with ramp-tracks from a previous band.

7. The apparatus of claim 1, wherein the self-servo-write controller is configured to cause performance of the post-assembly operations comprising:
   measuring ramp-track slope as a function of write head track width; and
   adjusting a radial stepping size based on said measuring to facilitate writing of uniformly spaced servo tracks.

8. A system comprising:
   a processor;
   a recording disk operationally coupled with the processor;
   a transducer configured to write to the recording disk; and
   a self-servo-write controller configured to cause performance of post-assembly operations comprising writing a band of ramp-tracks to the recording disk starting from a hard-stop position, each ramp-track spanning less than half a distance from an inner diameter to an outer diameter of the recording disk, and writing servo information to the recording disk using the band of ramp-tracks as a seed.

9. The system of claim 8, wherein the self-servo-write controller is configured to cause writing the servo information by causing operations comprising: writing a first portion of servo information to the recording disk using the band of ramp-tracks, and writing a second portion of servo information to the recording disk using the first portion of servo information.

10. The system of claim 9, wherein the self-servo-write controller is configured to cause writing the second portion of servo information by causing operations comprising: writing a next band of ramp-tracks using a previously written portion of the servo information as a reference, and writing a next portion of the servo information using a previously written band of ramp-tracks as a reference.

11. The system of claim 10, wherein the self-servo-write controller is configured to cause writing of each of the first portion and the next portion of the servo information by extending a servo track zone past an edge of a corresponding ramp-track zone to prevent intersection of ramp-tracks from one ramp-track zone with ramp-tracks from a previous ramp-track zone.

12. The system of claim 8, wherein the self-servo-write controller is configured to cause writing a ramp-track by initiating a Voice-Coil Motor (VCM) ramping process from a preset angular position using a previously calibrated VCM current profile, the VCM ramping process comprising: accelerating a VCM actuator to a target radial velocity in a first target amount of time, and writing the ramp-track during a second target amount of time while maintaining the target radial velocity.

13. The system of claim 8, wherein the self-servo-write controller is configured to cause performance of the post-assembly operations comprising writing overlapping, staggered bands of ramp-tracks such that ramp-tracks from one band do not intersect with ramp-tracks from a previous band.

14. The system of claim 8, wherein the self-servo-write controller is configured to cause performance of the post-assembly operations comprising:
measuring ramp-track slope as a function of write head track width; and
adjusting a radial stepping size based on said measuring to facilitate writing of uniformly spaced servo tracks.

15. An apparatus comprising:
means for recording data;
means for writing to the means for recording; and
post-assembly means for self-servo-writing to the means for recording, including means for writing a band of ramp-tracks to the means for recording starting from a hard-stop position, each ramp-track spanning less than half a distance from an inner diameter to an outer diameter of the means for recording, and means for writing servo information to the means for recording using the band of ramp-tracks as a seed.

16. The apparatus of claim 15, wherein the post-assembly means for self-servo-writing comprises means for writing a first portion of servo information to the means for recording using the band of ramp-tracks, and means for writing a second portion of servo information to the means for recording using the first portion of servo information.

17. The apparatus of claim 16, wherein the post-assembly means for self-servo-writing comprises means for writing a next band of ramp-tracks using a previously written portion of the servo information as a reference, and means for writing a next portion of the servo information using a previously written band of ramp-tracks as a reference.

18. The apparatus of claim 17, wherein the post-assembly means for self-servo-writing comprises means for extending a servo track zone past an edge of a corresponding ramp-track zone to prevent intersection of ramp-tracks from one ramp-track zone with ramp-tracks from a previous ramp-track zone.

19. The apparatus of claim 15, wherein the post-assembly means for self-servo-writing comprises means for writing a ramp-track by initiating a Voice-Coil Motor (VCM) ramping process from a preset angular position using a previously calibrated VCM current profile, the VCM ramping process comprising: accelerating a VCM actuator to a target radial velocity in a first target amount of time, and writing the ramp-track during a second target amount of time while maintaining the target radial velocity.

20. The apparatus of claim 15, wherein the post-assembly means for self-servo-writing comprises means for writing overlapping, staggered bands of ramp-tracks such that ramp-tracks from one band do not intersect with ramp-tracks from a previous band.

21. The apparatus of claim 15, wherein the post-assembly means for self-servo-writing comprises:
means for measuring ramp-track slope as a function of write head track width; and
means for adjusting a radial stepping size based on said means for measuring to facilitate writing of uniformly spaced servo tracks.

* * * * *